(12) United States Patent
Lewis et al.

(10) Patent No.: US 7,956,102 B2
(45) Date of Patent: Jun. 7, 2011

(54) SOL-GEL INKS

(75) Inventors: Jennifer A. Lewis, Urbana, IL (US);
Eric B. Duoss, Urbana, IL (US);
Mariusz Twardowski, Newtonville, MA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 11/733,067

(22) Filed: Apr. 9, 2007

(65) Prior Publication Data

US 2008/0245266 A1 Oct. 9, 2008

(51) Int. Cl.
*C09D 11/00* (2006.01)
*C08F 222/40* (2006.01)
*C08F 8/30* (2006.01)
*B01J 13/00* (2006.01)
*C08G 67/02* (2006.01)
*C08K 5/04* (2006.01)
*C08K 5/00* (2006.01)
*B41J 2/01* (2006.01)
*B41J 2/015* (2006.01)
*B41J 2/14* (2006.01)
*B41J 2/17* (2006.01)

(52) U.S. Cl. ........ 523/160; 523/161; 524/394; 524/398; 524/399; 524/548; 524/555; 524/557; 524/612; 347/1; 347/20; 347/47; 347/95

(58) Field of Classification Search .................. 523/160, 523/161; 524/413, 548, 555, 557, 612, 394, 524/398, 399; 264/401, 308; 425/174.4, 425/375; 347/1, 20, 47, 95
See application file for complete search history.

(56) References Cited

U.S. PATENT DOCUMENTS

| | | | |
|---|---|---|---|
| 2,892,797 A | 6/1959 | Alexander et al. | |
| 3,878,034 A | 4/1975 | Bever et al. | |
| 4,178,270 A | 12/1979 | Fujita | |
| 4,181,532 A | 1/1980 | Woodhead | |
| 4,410,457 A | 10/1983 | Fujimura et al. | |
| 4,414,354 A | 11/1983 | Slocombe | |
| 4,426,356 A | 1/1984 | Nair | |
| 4,446,174 A | 5/1984 | Maekawa et al. | |
| 4,471,100 A | 9/1984 | Tsubakimoto et al. | |
| 4,701,218 A | 10/1987 | Barker et al. | |
| 4,818,614 A | 4/1989 | Fukui et al. | |
| 4,946,904 A | 8/1990 | Akimoto et al. | |
| 4,960,465 A | 10/1990 | Arfaei | |
| 5,021,596 A * | 6/1991 | Barfurth et al. ................. 556/55 |
| 5,100,984 A | 3/1992 | Burge et al. | |
| 5,147,841 A | 9/1992 | Wilcoxon | |
| 5,196,199 A | 3/1993 | Fuisz | |
| 5,237,017 A | 8/1993 | Akiyama et al. | |
| 5,238,625 A * | 8/1993 | Sakurai et al. ................. 264/621 |
| 5,250,476 A | 10/1993 | Mogensen et al. | |
| 5,284,894 A | 2/1994 | Wasyliw et al. | |
| 5,344,487 A | 9/1994 | Whalen-Shaw | |
| 5,369,198 A | 11/1994 | Albrecht et al. | |
| 5,393,343 A | 2/1995 | Darwin et al. | |
| 5,416,071 A | 5/1995 | Igari et al. | |
| 5,424,362 A | 6/1995 | Hwang et al. | |
| 5,424,364 A | 6/1995 | Simms et al. | |
| 5,424,466 A | 6/1995 | Stern et al. | |
| 5,424,467 A | 6/1995 | Bam et al. | |
| 5,424,477 A | 6/1995 | Higuchi et al. | |
| 5,429,761 A | 7/1995 | Havelka et al. | |
| 5,516,836 A | 5/1996 | Sauer et al. | |
| 5,545,280 A | 8/1996 | Wenz | |
| 5,556,460 A | 9/1996 | Berke et al. | |
| 5,597,871 A | 1/1997 | Auschra et al. | |
| 5,607,892 A | 3/1997 | Chopin et al. | |
| 5,643,247 A | 7/1997 | Fernandez et al. | |
| 5,646,200 A * | 7/1997 | Duncan ........................ 523/160 |
| 5,651,986 A | 7/1997 | Brem et al. | |
| 5,654,006 A | 8/1997 | Fernandez et al. | |
| 5,665,158 A | 9/1997 | Darwin et al. | |
| 5,753,037 A | 5/1998 | Drs et al. | |
| 5,753,261 A | 5/1998 | Fernandez et al. | |
| 5,800,922 A | 9/1998 | Anderson et al. | |
| 5,811,124 A | 9/1998 | Fernandez et al. | |
| 5,820,879 A | 10/1998 | Fernandez et al. | |
| 5,883,196 A | 3/1999 | Rath et al. | |
| 5,891,313 A | 4/1999 | Johnson et al. | |
| 5,957,828 A | 9/1999 | Hayashi | |
| 5,958,858 A | 9/1999 | Bettiol et al. | |
| 5,962,608 A * | 10/1999 | Ryang et al. ................... 526/89 |
| 6,008,181 A | 12/1999 | Cripe et al. | |
| 6,015,781 A | 1/2000 | Vinson et al. | |

(Continued)

FOREIGN PATENT DOCUMENTS

AU    B-64095/80    9/1982

(Continued)

OTHER PUBLICATIONS

Morissette et al, Journal of the American Ceramics Society, Solid Freefrom Fabrication of Aqueous Alumina-Poly(vinyl alcohol) Gelcasting Suspensions, vol. 83, Issue 10, pp. 2409-2416, 2000.*

Morissette et al, Journal of the American Ceramics Society, "Chemorheology of Aqueous-Based Alumina-Poly(vinyl alcohol) Gelcasting Suspensions", vol. 82, Issue 3, pp. 521-528, 1999.*

Kozuka et al "Crack-Free, Thick Ceramic Coating Films via Non-Repetitive Dip-Coating Using Polyvinylpyrrolidone as a Stree-Relaxing Agent", Journal of Sol-Gel Science and Technology, vol. 19, pp. 205-209, 2000.*

Pang Xu, "Polymer-Ceramic Nanocomposites: Ceramic Phases" Encyclopedia of Materials: science and Technology pp. 1-6, Pergamon Press (2001).*

(Continued)

*Primary Examiner* — Basia Ridley
*Assistant Examiner* — Alexander C Kollias
(74) *Attorney, Agent, or Firm* — Brinks Hofer Gilson & Lione (57) ABSTRACT

The invention provides an ink which comprises: a metal oxide precursor, a stress reliever, and a solvent.

26 Claims, 8 Drawing Sheets

U.S. PATENT DOCUMENTS

| | | | |
|---|---|---|---|
| 6,020,303 | A | 2/2000 | Cripe et al. |
| 6,027,326 | A | 2/2000 | Cesarano, III et al. |
| 6,051,636 | A | 4/2000 | Johnson et al. |
| 6,060,443 | A | 5/2000 | Cripe et al. |
| 6,080,216 | A | 6/2000 | Erickson |
| 6,093,856 | A | 7/2000 | Cripe et al. |
| 6,103,868 | A | 8/2000 | Heath et al. |
| 6,107,409 | A | 8/2000 | Hogan et al. |
| 6,127,094 | A | 10/2000 | Victor et al. |
| 6,133,222 | A | 10/2000 | Vinson et al. |
| 6,133,227 | A | 10/2000 | Barnabas et al. |
| 6,136,333 | A | 10/2000 | Cohn et al. |
| 6,136,428 | A | 10/2000 | Truong et al. |
| 6,136,769 | A | 10/2000 | Asano |
| 6,139,623 | A | 10/2000 | Darwin et al. |
| 6,150,459 | A | 11/2000 | Mayes et al. |
| 6,153,577 | A | 11/2000 | Cripe et al. |
| 6,165,406 | A | 12/2000 | Jang et al. |
| 6,167,910 | B1 | 1/2001 | Chow |
| 6,207,749 | B1 | 3/2001 | Mayes et al. |
| 6,211,249 | B1 | 4/2001 | Cohn et al. |
| 6,228,829 | B1 | 5/2001 | Vinson et al. |
| 6,242,406 | B1 | 6/2001 | Katsuda et al. |
| 6,258,161 | B1 | 7/2001 | Kerkar et al. |
| 6,262,129 | B1 | 7/2001 | Murray et al. |
| 6,277,191 | B1 | 8/2001 | Budiansky et al. |
| 6,321,791 | B1 | 11/2001 | Chow |
| 6,379,974 | B1 | 4/2002 | Parce et al. |
| 6,395,804 | B1 | 5/2002 | Rao et al. |
| 6,436,167 | B1 | 8/2002 | Chow et al. |
| 6,441,054 | B1 | 8/2002 | Ou et al. |
| 6,451,433 | B1 | 9/2002 | Oka et al. |
| 6,465,257 | B1 | 10/2002 | Parce et al. |
| 6,471,761 | B2 | 10/2002 | Fan et al. |
| 6,499,499 | B2 | 12/2002 | Dantsker et al. |
| 6,517,199 | B1 | 2/2003 | Tomioka et al. |
| 6,572,673 | B2 | 6/2003 | Lee et al. |
| 6,595,232 | B2 | 7/2003 | Guzman et al. |
| 6,596,545 | B1 | 7/2003 | Wagner et al. |
| 6,599,647 | B2 | 7/2003 | Oguri et al. |
| 6,645,444 | B2 | 11/2003 | Goldstein |
| 6,670,415 | B2 | 12/2003 | Jardine et al. |
| 6,673,285 | B2 | 1/2004 | Ma |
| 6,746,510 | B2 | 6/2004 | Kurihara et al. |
| 6,861,205 | B2 | 3/2005 | Bowman et al. |
| 6,878,184 | B1 | 4/2005 | Rockenberger et al. |
| 6,929,675 | B1 | 8/2005 | Bunge et al. |
| 6,942,825 | B2 | 9/2005 | Honda et al. |
| 6,974,493 | B2 | 12/2005 | Harutyunyan et al. |
| 7,053,125 | B2 | 5/2006 | Lewis et al. |
| 7,081,322 | B2 | 7/2006 | Ray et al. |
| 7,141,617 | B2 * | 11/2006 | Gratson et al. .......... 523/160 |
| 7,160,525 | B1 | 1/2007 | Peng et al. |
| 7,198,736 | B2 | 4/2007 | Kasuga et al. |
| 2001/0049912 | A1 | 12/2001 | Motonari et al. |
| 2002/0015846 | A1 | 2/2002 | Evans et al. |
| 2002/0016387 | A1 | 2/2002 | Shen |
| 2002/0121229 | A1 | 9/2002 | Jardine et al. |
| 2002/0147282 | A1 | 10/2002 | Mayes et al. |
| 2002/0182171 | A1 | 12/2002 | Detert et al. |
| 2002/0195747 | A1 * | 12/2002 | Hull et al. .......... 264/401 |
| 2003/0032727 | A1 | 2/2003 | Narayan-Sarathy et al. |
| 2003/0091647 | A1 | 5/2003 | Lewis et al. |
| 2003/0162004 | A1 * | 8/2003 | Mirkin et al. .......... 428/210 |
| 2003/0177690 | A1 | 9/2003 | Wittkowski et al. |
| 2004/0076822 | A1 | 4/2004 | Jagota et al. |
| 2004/0096469 | A1 | 5/2004 | Lewis et al. |
| 2004/0161544 | A1 | 8/2004 | Kasperchik |
| 2004/0226620 | A1 | 11/2004 | Therriault et al. |
| 2005/0004261 | A1 * | 1/2005 | Yatake .......... 523/160 |
| 2005/0189520 | A1 * | 9/2005 | Okada et al. .......... 252/500 |
| 2005/0196605 | A1 * | 9/2005 | Ramsey .......... 428/323 |
| 2006/0235105 | A1 | 10/2006 | Gratson et al. |
| 2006/0239902 | A1 * | 10/2006 | Kimura et al. .......... 423/594.17 |
| 2007/0172588 | A1 | 7/2007 | Therriault et al. |
| 2007/0228335 | A1 | 10/2007 | Gratson et al. |
| 2008/0245266 | A1 | 10/2008 | Lewis et al. |
| 2009/0000678 | A1 | 1/2009 | Therriault et al. |

FOREIGN PATENT DOCUMENTS

| | | |
|---|---|---|
| DE | 2052749 | 5/1972 |
| EP | 362770 A2 | 4/1990 |
| EP | 0 263 490 B1 | 1/1995 |
| GB | 2094820 A | 9/1982 |
| WO | WO 97/19711 A1 | 6/1997 |
| WO | WO 99/51335 | 10/1999 |
| WO | WO 00/47628 A | 8/2000 |
| WO | WO 01/89787 A2 | 11/2001 |
| WO | WO 02/20627 A | 3/2002 |
| WO | WO 2004/043853 * | 5/2004 |
| WO | WO 2005/000977 | 1/2005 |
| WO | WO 2005/083726 * | 9/2005 |

OTHER PUBLICATIONS

Caracoche et al, "Zirconium Oxide Structures Prepared by the Sol-Gel Route: I, The Role of the Alcoholic solvent", Journal of the American Ceramics Society, vol. 83, No. 2 pp. 377-384 (2000).*

Su et al "Moving beyod Molecules: Patterning Solid-State Features via Dip-Pen Nanolithography with Sol-Based Inks" Journal of the Americ Chemcial Society, vol. 124, No. 8 pp. 1560-1561 (2002).*

Technical Bulletin: Pluronic P123 Block Copolymer Surfactant, BASF 2004.*

Alain C. Pierre, "Intriduction to Sol-Gel Processing", Kluwer Academic Publishers, Boston, pp. 2-3 (1998).*

Li et al "Fabrication of Titania Nanofibers by Electrospinning", Nanoletters, vol. 3, No. 4, pp. 555-560 (2003).*

ADVA® Flow Superplasticizer ASTM C494, Type F (carboxylated polyether) with Material Safety Data Sheet (MSDS), Grace Construction Products 10 p., 2002.

Anderson, J.R., et al., "Fabrication of Topologically Complex Three-Dimensional Microfluidic Systems in PDMS by Rapid Prototyping", Anal. Chem. 72, pp. 3158-3164, 2000.

Aref, H., "The Development of Chaotic Advection", Phys. Fluids 14, pp. 1315-1325, 2002.

Axim Italcementi Group, Catexol™ Superflux 2000 PC, with Material Safety Data Sheet (MSDS), 7 p., Nov. 13, 2002.

Bautista, F. et al., "Understanding Thixotropic and Antithixotropic Behavior of Viscoelastic Micellar Solutions and Liquid Crystalline Dispersions. I. The Model." Journal of Non-Newtonian Fluid Mechanics, vol. 80, pp. 93-113, 1999.

Bell, Nelson, et al., "Cation-Induced Collapse of Low-Molecular-Weight Polyacrylic Acid in the Dispersion of Barium Titanate", Journal of Colloid and Interface Science, 254, pp. 296-305, 2002.

Berg, J.M., et al., "Interactions between Mica Surfaces in Sodium Polyacrylate Solutions Containing Calcium Ions", Journal of Colloid and Interface Science, 161, pp. 182-189, 1993.

Breitenbach, A., et al. "Branched biodegradable polyesters for parenteral drug delivery systems", Journal of Controlled Release, vol. 64, pp. 167-178, 2000.

Burns, M.A., et al., "An Integrated Nanoliter DNA Analysis Device" Science 282, pp. 484-487, 1998.

Campbell, et al., "Fabrication of Photonic Crystals for the Visible Spectrum by Holographic Lithography," Nature, pp. 53-56, vol. 404, 2000.

Caruso et al., "Nanoengineering of Inorganic and Hybrid Hollow Spheres by Colloidal Templating," Science, pp. 1111-1114, vol. 282, 1998.

Cassagneau et al., "Conjugated Polymer Inverse Opals for Potentiometric Biosensing," Adv. Mater., pp. 1837-1841, vol. 14, 2002.

Cesarano III, Joseph et al., "Processing of Highly Concentrated Aqueous α-Alumina Suspensions Stabilized with Polyelectrolytes", J. Am. Ceram. Soc., vol. 71 No. 12, pp. 1062-1067, 1988.

Cesarano III, Joseph, et al., "Stability of Aqueous α-$Al_2O_3$ Suspensions with Poly(methacrylic acid) Polyelectrolyte", J. Am. Ceram. Soc., vol. 71, No. 4, pp. 250-255, 1988.

Chabinyc, M.L., et al., "An Integrated Fluorescence Detection System in Poly(dimethylsiloxane) for Microfluidic Applications" Anal. Chem. 73, pp. 4491-4498, 2001.

Chen et al., "Geometric Control of Cell Life and Death," Science, pp. 1425-1428, vol. 276, 1997.

Abstract of Sakai et al., "Influence of various types of inorganic salts on dispersion mechanisms of comb-type polymer containing grafted polyethylene oxides chains," Journal of the Ceramic Society of Japan, vol. 108, No. 10, pp. 904-908, 2000.

Choi, J.W., et al., "An Active Microfluidic Mixer for Mixing of Microparticles and Liquids"; SPIE Proceedings 4177, The International Society for Optical Engineering, pp. 154-161, 2000.

Chou, H.P., et al., "A Microfabricated Device for Sizing and Sorting DNA Molecules", Proc. Natl. Acad. Sci. 96, pp. 11-13, 1999.

Chrisey et al., "Materials Processing: The Power of Direct Writing," Science, vol. 289, pp. 879-881, 2000.

Clark et al., "Creating Microstructures of Luminescent Organic Thin Films Using Layer-by-Layer Assembly," Adv. Mater., pp. 1031-1035, vol. 11, 1999.

Cumpston et al., "Two-Photon Polymerization Initiators for Three-Dimensional Optical Data Storage and Microfabrication," Nature, pp. 51-54, vol. 398, 1999.

Dahlgren, M., "Effect of Counterion Valency and Ionic Strength on Polyelectrolyte Adsorption" Langmuir vol. 10, No. 5, pp. 1580-1583, 1994.

De L. Costello, et al., "Experimental investigations of the interaction forces in concentrated dispersions", Colloids and Surfaces A: Physiochemical and Engineering Aspects, 77, pp. 55-63, 1993.

Decher, "Fuzzy Nanoassemblies: Toward Layered Polymeric Multicomposites," Science, pp. 1232-1237, vol. 277, 1997.

Demers et al., "Direct Patterning of Modified Oligonucleotides on Metals and Insulators by Dip-Pen Nanolithography," Science, pp. 1836-1838, vol. 296, 2002.

Fan, H., "Rapid Prototyping of Patterned Functional Nanostructures," Nature, vol. 405, pp. 56-60, 2000.

Feiertag et al., "Fabrication of Photonic Crystals by Deep X-Ray Lithography," Appl. Phys. Lett., pp. 1441-1443, vol. 71, 1997.

Fery et al., "Nanoporous Thin Films Formed by Salt-Induced Structural Changes in Multilayers of Poly(acrylic Acid) and Poly(allylamine)," Langmuir, pp. 3779-3783, vol. 17, 2001.

Foresi et al., "Photonic-Bandgap Microcavities in Optical Waveguides," Nature, pp. 143-145, vol. 390, 1997.

Hadjichristidis, N., "Polymers with Complex Architecture by Living Anionic Polymerization", Chem. Rev. vol. 101, pp. 3747, 3771-3775, 2001.

Jacoby, Mitch, 3-D Structures From Stable Gels:, Chemical & Engineering News, vol. 80, No. 26, p. 7, Jul. 1, 2002.

Jeon, N. L., et al., "Generation of Solution and Surface Gradients Using Microfluidic Systems", Langmuir 16, pp. 8311-8316, 2000.

Jiang et al., "Exploring the Rules for Selective Deposition: Interactions of Model Polyamines on Acid and Oligoethylene Oxide Surfaces," Langmuir, pp. 1131-1143, vol. 18, 2002.

Jiang et al., "Polymer-On-Polymer Stamping: Universal Approaches to Chemically Patterned Surfaces," Langmuir, pp. 2607-2615, vol. 18, 2002.

Jones, S.W., "Interaction of Chaotic Advection and Diffusion", Chaos Applied to Fluid Mixing, Aref, H. and El Naschie, M.S., eds., pp. 185-196, 1995.

Kenny, Jack, "Digital Printing: The Excitement Grows", www.labelandnarrowweb.com, pp. 1-5, Nov. 2000.

Kenny, Jack, "Specialty Ink", www.labelandnarrowweb.com, pp. 1-4, Sep. 2003.

Kiriy et al., "Cascade of Coil-Globule Conformational Transitions of Single Flexible Polyelectrolyte Molecules in Poor Solvent," J. Am. Chem. Soc., pp. 13454-13462, vol. 124, 2002.

Laarz, E. et al., "The Effect of Anionic Polyelectrolytes on the Properties of Aqueous Silicon Nitride Suspensions", Journal of the European Ceramic Society, vol. 20, pp. 431-440, 2000.

Label & Narrow Web, "Specialty Inks", pp. 1-14., Nov. 2000.

Landers et al., "Rapid Prototyping of Scaffolds Derived from Thermoreversible Hydrogels and Tailored for Applications in Tissue Engineering," Biomaterials, pp. 4437-4447, vol. 23, 2002.

Lazaris et al., "Spider Silk Fibers Spun from Soluble Recombinant Silk Produced in Mammalian Cells," Science, pp. 472-476, vol. 295, 2002.

Lee et al., "Multi-Photon Polymerization of Waveguide Structures Within Three-Dimensional Photonic Crystals," Adv. Mater., pp. 271-274, vol. 14, 2002.

Lewis, "Direct-Write Assembly of Ceramics from Colloidal Inks," Curr. Opin. Solid State Mat. Sci., pp. 245-250, vol. 6, 2002.

Li, C., et al., "Effect of a comb-like amphiphilic polymer on the stability of alumina dispersions", Colloids and Surfaces, 69, pp. 155-158, 1992.

Li, Chia-Chen, et al., "Interaction between Dissolved Ba2+ and PAA-NH4 Dispersant in Aqueous Barium Titanate Suspensions", Journal of the American Ceramic Society, vol. 85, No. 6, pp. 1449-1455, 2002.

Lin et al., "A Three-Dimensional Photonic Crystal Operating at Infrared Wavelengths," Nature, pp. 251-253, vol. 394, 1998.

Loctite Corporation Prussian Blue, Material Safety Data Sheet dated Jan. 6, 2002, 5 pages; http://www.loctite.com/datasheets/msds/30520.html, Jan. 14, 2002.

Loctite® Product Description Sheet Prussian Blue, Maintenance, Repair & Operations, 1p, Jan. 1999.

Losey, M.W., et al., "Microfabricated Multiphase Packed-Bed Reactors: Characterization of Mass Transfer and Reactions", Ind. Eng. Chem. Res. 40, pp. 2555-2562, 2001.

Mas, R., et al., "Rheology of Colloidal Suspensions: Case of Lubricating Greases," Journal of Rheology, vol. 38, No. 4, pp. 889-908, 1994.

Meier-Haack et al., "Pervaporation Separation of Water/Alcohol Mixtures Using Composite Membranes Based on Polyelectrolyte Multilayer Assemblies," J. Membr. Sci., pp. 233-243, vol. 184, 2001.

Moore, S.K., "Microfluidics for Complex Computation", IEEE Spectrum 38, pp. 28-29, 2001.

Napper, Donald H., "Polymeric Stabilization of Colloidal Dispersions" Academic Press, Inc., pp. 28-30, 1983.

Noda et al., "Full Three-Dimensional Photonic Bandgap Crystals at Near-Infrared Wavelengths," Science, pp. 604-606, vol. 289, 2000.

Orgeret-Ravanat, C. et al., "Adsorption/Desorption of a PEO-rich Comb-like Polymer at a Silica/Aqueous Solution Interface", Colloids and Surfaces vol. 33, pp. 109-119, 1988.

Piner et al., "Dip-Pen" Nanolithography, Science, pp. 661-663, vol. 283, 1999.

Polymer Source, Inc., Information Sheet—Custom Synthesis, comb polymer (poly(acrylic acid) backbone and poly(ethylene oxide) teeth), 2 p., Nov. 13, 2002.

Reed, James S., "Principles of Ceramic Processing", $2^{nd}$ Ed., John Wiley & Sons, Inc., pp. 525-541, 1995.

Sakai, E., et al., "Dispersion Mechanisms of Comb-Type Superplasticizers Containing Grafted Poly(ethylene oxide) Chains", Macromol. Symp. 175, pp. 367-376, 2001.

Schwartz, Steven A., "Gypsum Dispersing Agents", Global Gypsum Conference, pp. 1-10, 2002.

Seidel et al., "Artificial Spinning of Spider Silk," Macromolecules, pp. 6733-6736, vol. 31, 1998.

Silkroad C&T:Admixtures for Concrete, PEMA-200N, Product Information Sheet, 2 p., 2002.

Smay et al., "Colloidal Inks for Directed Assembly of 3-D Periodic Structures," Langmuir, pp. 5429-5437, vol. 18, 2002.

Smay et al., "Directed Colloidal Assembly of 3D Periodic Structures," Adv. Mater., pp. 1279-1283, vol. 14, 2002.

Smay, James E., et al., "Colloidal Inks for Directed Assembly of 3-D Periodic Structures", Langmuir, pp. 5429-5437, vol. 18, No. 14, 2002.

Stenius, P. et al., "Aggregation in concentrated kaolin suspensions stabilized by polyacrylate", Colloids and Surfaces, vol. 51, pp. 219-238, 1990.

Stromberg, A., et al., "Microfluidic Device for Combinatorial Fusion of Liposomes and Cells", Anal. Chem. 73, pp. 126-130 2001.

Sukhishvili et al., "Layered, Erasable, Ultrathin Polymer Films," J. Am. Chem. Soc., pp. 9550-9551, vol. 122, 2000.

Takemoto Oil & Fat Co. Ltd. Product Information Sheet, 2 p., Nov. 13, 2002.

Tobori, N. et al., "Rheological behavior of highly concentrated aqueous calcium carbonate suspensions in the presence of polyelectrolytes", Colloids and Surfaces A: Physiochem. Eng. Aspects 00, pp. 1-9, 2002; (2 pages) vol. 215, pp. 163-171, 2003.

Uhrig, D., et al., "Synthesis of Combs, Centipedes, and Barbwires: Poly(isoprene-graft-styrene) Regular Multigraft Copolymers with Trifunctional, Tetrafunctional, and Hexafunctional Branch Points", Macromolecules vol. 35, pp. 7182-7190, 2002.

Vermohlen, K., et al., "Adsorption of polyelectrolytes onto oxides—the influence of ionic strength, molar mass, and Ca2+ ions", Colloids and Surfaces A: Physicochem. Eng. Aspects 163, pp. 45-53, 2000.

Vlasov et al., "On-Chip Natural Assembly of Silicon Photonic Bandgap Crystals," Nature, pp. 289-293, vol. 414, 2001.

Vollrath et al., "Liquid Crystalline Spinning of Spider Silk," Nature, pp. 541-548, vol. 410, 2001.

White, S.R., et al., "Autonomic Healing of Polymer Composites", Nature 409, pp. 794-797, 2001.

Wu et al., "Fabrication of Complex Three-Dimensional Microchannel Systems in PDMS," J. Am. Chem. Soc., pp. 554-559, vol. 125, 2003.

Xia et al., "Soft Lithography," Angew. Chem Int. Ed., pp. 550-575, vol. 37, 1998.

Zezin et al., "A New Class of Complex Water-Soluble Polyelectrolytes," Russ. Chem. Rev., pp. 833-855, vol. 51, 1982.

Allahyarov, E. et al., "Attraction between Like-Charged Macroions by Coulomb Depletion", Physical Review Letters, vol. 81, No. 6, pp. 1334-1337, 1998.

Allahyarov, E. et al., "Effective forces between macroions: The cases of asymmetric macroions and added salt", Physical Review E, vol. 57, No. 5, pp. 5818-5824, 1998.

BIC, "Zeta Potential Applications", article from the Internet, http://www.bic.comfZetaPotentialApplications.htm>, 4 pages, printed Sep. 14, 2001.

Braun, Paul V. et al., "Electrochemical Fabrication of 3D Microperiodic Porous Materials", Advanced Materials, vol. 13, No. 7, pp. 482-485, 2001.

Braun, Paul V. et al., "Electrochemically grown photonic crystals", Nature, vol. 402, pp. 603-604, 1999.

Braun, Paul V. et al., "Optical spectroscopy of high dielectric contrast 3D photonic crystals", Europhys. Lett., vol. 56, pp. 207-213, 2001.

CAMP Annual Report 2000, "Colloidal Dispersions and Processing", Center for Advanced Materials Processing, 2000, article from the Internet, http://www.clarkson.edu/camp/annual_report/page6.htm>, 2 pages, printed Sep. 14, 2001.

Ferreira, Paula G. et al., "Mixtures of charged colloids and nonadsorbing flexible polyelectrolytes: An integral equation study", J. Chem. Phys., vol. 113, No. 21, pp. 9849-9862, 2000.

Garibay-Alonso, R. et al., "Phase separation of binary liquid mixtures of hard spheres and Yukawa particles", Physica A, vol. 235, pp. 159-169, 1997.

Malvern, "The use of the Malvern Zetasizer for the measurement of Zeta Potential", article from the Internet, http://www.malvern.co.alLaboratory/zetaintm.htm>, 10 pages, printed on Feb. 12, 2002.

Malvern, "Zeta Potential Theory, Dispersion stability", article from the Internet, http://www.malvern.co.uk/Laboratory/zettheo.htm>, 3 pages, printed on Feb. 12, 2002.

Mendez-Alcaraz, J.M. et al., "Depletion forces in colloidal mixtures", Physical Review E, vol. 61, No. 4, pp. 4095-4099, 2000.

Mendez-Alcaraz, J.M. et al., "Structural properties of colloidal suspensions", Physica A, vol. 220, pp. 173-191, 1995.

Mendez-Alcaraz, J.M. et al., "Structure of Binary Colloidal Mixtures of Charged and Uncharged Spherical Particles", Langmuir, vol. 8, pp. 2913-2920, 1992.

Nguyen, T. T. et al., "Macroions in Salty Water with Multivalent Ions: Giant Inversion of Charge", Physical Review Letters, vol. 85, No. 7, pp. 1568-1571, 2000.

Ramakrishnan, S. et al., "Characterizing nanoparticle interactions: Linking models to experiments", J. Chem. Phys., vol. 113, No. 3, pp. 1237-1248, 2000.

Rouzina, Ioulia et al., "Macroion Attraction Due to Electrostatic Correlation between Screening Counterions. 1. Mobile Surface-Adsorbed Ions and Diffuse Ion Cloud", J. Chem. Phys., vol. 100, No. 23, pp. 9977-9989, 1996.

The Sol-Gel Gateway, "Suppliers-Colloidal solutions and nanoparticles", article from the Internet, http://www.solgel.com/precursors/sols.htm>, 3 pages, printed on Sep. 14, 2001.

Tohver, Valeria, "Nanoparticle Engineering of Complex Fluid Behavior", Langmuir, vol. 17, No. 26, pp. 8414-8421, 2001.

Tohver, Valeria, "Nanoparticle halos: A new colloid stabilization mechanism", PNAS, vol. 98, No. 16, pp. 8950-8954, 2001.

Verhaegh, Nynke et al., "Transient gelation by spinodal decomposition in colloid-polymer mixtures", Physica A, vol. 242, pp. 104-118, 1997.

Verhaegh, Nynke et al., "Transient gels in colloid-polymer mixtures studied with fluorescence confocal scanning laser microscopy", Physica A, vol. 264, pp. 64-74, 1999.

Weeks, James R., "Formation and collapse of gels of sterically stabilized colloidal particles", J Phys. Condens. Matter, vol. 12, pp. 9599-9606, 2000.

Wessling, Dr. Berhard, "Conductive Polymer / Solvent Systems: Solutions or Dispersions?", Zipperling Kessler/ Ormecon Chemie, dated 1996, article from the Internet, http://www.zipperling.de/Research/soludisp/kap13.html>2 pages, printed Sep. 14, 2001.

Vincent, B. et al., "Adsorption of Small, Positive Particles onto Large, Negative Particles in the Presence of Polymer", J.C.S. Faraday I, V. 76, Iss. 3, pp. 665-673, 1980.

Luckham, P.F., et al., "The Controlled Flocculation of Particulate Dispersions Using Small Particles of Opposite Charge. III. Investigation of Floc Structure Using Rheological Techniques", Colloids and Surfaces, vol. 6, pp. 101-118, 1983.

Hawley's Condensed Chemical Dictionary, Eleventh Edition, edited by Sax and Lewis, Sr. (Van Nostrand Reinhold Company, New York, NY, copyright 1987),p. 25, (Oct. 1989).

Michna, S. et al., "Concentrated hydroxyapatite inks for direct-write assembly of 3-D periodic scaffolds", Biomaterials, vol. 26, pp. 5632-5639, (2005).

Deubel, M. et al., "Direct laser writing of three-dimensional photonic-crystal templates for telecommunications", Nature Materials, vol. 3, pp. 444-447, (2004).

Kim, I. et al., "Ultrasensitive chemiresistors based on electrospun $TiO_2$ nanofibers", NanoLetters, vol. 6, No. 9, pp. 2009-2013, (2006).

Ding, X-Z. et al., "Effect of tin dioxide doping on rutile phase formation in sol-gel-derived nanocrystalline titania powders", NanoStructured Materials, vol. 4, No. 6, pp. 663-668, (1994).

Chutinan, A. et al., "Highly confined waveguides and waveguide bends in three-dimensional photonic crystal", Applied Physics Letters, vol. 75, No. 24, pp. 3739-3741, (1999).

Cotton, F.A. et al., Advanced Inorganic Chemistry, Fifth Edition, ed. John Wiley & sons, pp. 215-217, pp. 781-782, 7 pages total, (1988).

Seet, K.K. et al., "Three-dimensional spiral-architecture photonic crystals obtained by direct laser writing", Advanced Materials, vol. 17, No. 5, pp. 541-545, (2005).

Morissette, S.L. et al., "Solid freeform fabrication of aqueous alumina-poly(vinyl alcohol) gelcasting suspensions", Journal of the American Ceramic Society, vol. 83, No. 10, pp. 2409-2416, (2000).

Morrissette, S.L. et al., "Chemorheology of aqueous-based alumina-poly(vinyl alcohol) gelcasting suspensions", Journal of the American Ceramic Society, vol. 82, No. 3, pp. 521-528, (1999).

Kozuka H. et al., "Crack-free thick ceramic coating films via non-repetitive dip-coating using polyvinylpyrrolidone as stress-relaxing agent", Journal of Sol-Gel Science and Technology, vol. 19, pp. 205-209, (2000).

DuPont Tyzor Organic Titanates General Brochure found at http://www.dupont.com/tyzor, 12 pages, (2001).

Duoss, E.B. et al, "Sol-gel inks for direct-write assembly of functional oxides", Adv. Mater, vol. 19, pp. 3485-3489, (2007).

Weeks, E.R. et al., "Three-Dimensional Direct Imaging of Structural Relaxation Near the Colloidal Glass Transition", Science, vol. 287, pp. 627-631, (2000).

Manley, S. et al., "Glasslike Arrest in Spinodal Decomposition as a Route to Colloidal Gelation", Phys. Rev. Lett., 95, Art. No. 238302, pp. 238302-1 thru 23802-4, (2005).

Trappe, V. et al., "Jamming phase diagram for attractive particles", Nature, vol. 411, pp. 772-775, (2001).

Anderson, V.J. et al., "Insights into phase transition kinetics from colloid science", Nature, vol. 416, pp. 811-815, (2002).

Lewis, J.A., Colloidal Processing of Ceramics. J. Am. Ceram. Soc., 83, (10), pp. 2341-2359, (2000).

Martinez, C.J. et al., "Shape Evolution and Stress Development During Latex-Silica Film Formation", Langmuir, 18, pp. 4689-4698, (2002).

Fichtner, M. et al., "Small Ti clusters for catalysis of hydrogen exchange in NaAlH4. Nanotechnology", 14, (7), pp. 778-785, (2003).

Kim, A.S. et al, "Cake resistance of aggregates formed in the diffusion-limited-cluster-aggregation (DLCA) regime", J. Membrane Science, 286, pp. 260-268, (2006).

Weitz, D.A. et al., "Fractal Structures Formed by Kinetic Aggregation of Aqueous Gold Colloids", Phys. Rev. Lett., 52, pp. 1433-1436, (1984).

Carpineti, M. et al., "Transition from Semiorder to Disorder in the Aggregation of Dense Colloidal Solutions", Phys. Rev. Lett., 70, (24), pp. 3828-3830, (1993).

Chen, M. et al., "Characteristics of Flocculated Silica Dispersions", J. Colloid Interface Sci., 141, pp. 564-577, (1991).

Varadan, P. et al., "Direct visualization of long range structural heterogeneity in colloidal gels", Langmuir, 19, pp. 509-512 (2003).

Hütter, M., "Local Structure Evolution in Particle Network Formation Studied by Brownian Dynamics Simulation", J. Colloid and Interface Sci., 231, pp. 337-350, (2000).

Dinsmore, A.D. et al., "Microscopic Structure and Elasticity of Weakly Aggregated Colloidal Gels", Phys. Rev. Lett., 96, Art. No. 185502, pp. 185502-1 thru 185502-4, (2006).

Ramakrishnan, S. et al. "Microstructure and Rheology of Thermoreversible Nanoparticle Gels", Langmuir, 22, pp. 7833-7842, (2006).

Ramakrishnan, S. et al., "Clustering and mechanics in dense depletion and thermal gels", Langmuir, 21, pp. 9917-9925, (2005).

Chung, B. et al. "Microscopic Dynamics of Recovery in Sheared Depletion Gels", Phys. Rev. Lett., 96, Art. No. 228301, pp. 228301-1 thru 228301-4, (2006).

Krall, A.H. et al., "Internal Dynamics and Elasticity of Fractal Colloidal Gels", Phys. Rev. Lett., 80, (4), pp. 778-781, (1998).

Weeks, E.R. et al., "Properties of cage rearrangements observed near the colloidal glass transition", Phys. Rev. Lett., 89, (Art. No. 095704), pp. 095704-1 thru 095704-4, (2002).

Puertas, A.M. et al., "Dynamical heterogeneities close to a colloidal gel", J. Chem. Phys., 121, (6), pp. 2813-2822, (2004).

Puertas, A.M. et al., "Mode Coupling and Dynamical Heterogeneity in Colloidal Gelation A Simulation Study", J. Phys. Chem. B, 109, pp. 6666-6675, (2005).

Kegel, W.K. et al., "Direct Observation of Dynamical Heterogeneities in Colloidal Hard-Sphere Suspensions", Science, 287, pp. 290-293, (2000).

Crocker, J.C., "Methods of Digital Video Microscopy for Colloidal Studies", J. Colloid and Interface Sci., 179, pp. 298-310, (1996).

Dinsmore, A.D. et al., "Direct imaging of three-dimensional structure and topology of colloidal gels", J. Phys. Cond. Matter, 14, pp. 7581-7597, (2002).

Dibble, C.J. et al., "Structure and dynamics of colloidal depletion gels: Coincidence of transitions and heterogeneity", Phys. Rev. E., 74, Art. No. 041403, pp. 041403-1 thru 041403-11 (2006).

Leunissen, M.E. et al. "Ionic colloidal crystals of oppositely charged particles", Nature, 437, (8), pp. 235-240, (2005).

Van Blaaderen, a. et al., "Template-directed colloidal crystallization", Nature, 385, pp. 321-324, (1997).

Lee, W. et al., "Nanoparticle-Mediated Epitaxial Assembly of Colloidal Crystals on Patterned Substrates", Langmuir, 20, pp. 5262-5270, (2004).

Solomon, T. et al., "Stacking fault structure in shear-induced colloidal crystallization", J. Chem Phys., 124, Art. No. 134905, pp. 134905-1 thru 134905-10, (2006).

Schall, P. et al., "Visualization of Dislocation Dynamics in Colloidal Crystals", Science, 305, pp. 1944-1948, (2004).

Mohraz, A. et al., "Direct Visualization of Colloidal Rod Assembly by Confocal Microscopy", Langmuir, 21, pp. 5298-5306, (2005).

Pham, K.N. et al., "Multiple Glassy States in a Simple Model System", Science, 296, pp. 104-106, (2002).

Segre, P.N.; "Glasslike kinetic arrest at the colloidal-gelation transition", Phys. Rev. Lett., 86, (26), pp. 6042-6045, (2001).

Scheidler, P. et al., "Cooperative motion and growing length scales in supercooled confined liquids", Europhys. Letters, 59 (5), pp. 701-707, (2002).

Kim, K. et al., "Apparent finite-size effects in the dynamics of supercooled liquids", Phys. Rev. E, 61, (1), pp. R41-R44, (2000).

Malek, K. et al., "Effects of surface roughness on self- and transport diffusion in porous media in the Knudsen regime", Phys. Rev. Lett., 87, (12), Art. No. 125505, pp. 125505-1 thru 125505-4, (2001).

Elimelech, M. et al., "Kinetics of Deposition of Colloidal Particles in Porous Media", Environmental Science and Technology, 24, pp. 1528-1536, (1990).

Bogush, G.H. et al., "Preparation of monodisperse silica particles: Control of size and mass fraction", Journal of Non-Crystalline Solids, 104, pp. 95-106, (1988).

van Blaaderen, A. et al., "Synthesis and Characterization of Colloidal Dispersions of Fluorescent, Monodisperse Silica Spheres", Langmuir, 8, pp. 2921-2931, (1992).

Dinsmore, A.D. et al. "Three-dimensional confocal microscopy of colloids", Appl. Opt., 40, (24), pp. 4152-4159, (2001).

Baxter, R.J., "Percus-Yevick equation for hard spheres with surface adhesion", J. Chem. Phys. 49, pp. 2770-2774, (1968).

Shih, W-H, et al., "Scaling behavior of the elastic properties of colloidal gels", Phys. Rev. A, 42, (8), pp. 4772-4779, (1990).

de Rooij, R. et al., "Elasticity of weakly aggregating polystyrene latex dispersions", Phys. Rev. E, 49, (4), pp. 3038-3049, (1994).

Potanin, A.A. et al., "Microrheological modeling of weakly aggregated dispersions", J. Chem. Phys., 102, (14), pp. 5845-5853, (1995).

Wolthers, W. et al. "Linear viscoelastic behavior of aggregated colloidal dispersions", Phys. Rev. E, 56, (5), pp. 5726-5733, (1997).

Mellema, M. et al., "Categorization of rheological scaling models for particle gels applied to casein gels", J. Rheol., 46, (1), pp. 11-29, (2002).

Mohraz, A. et al, "Orientation and rupture of fractal colloidal gels during start-up of steady shear flow", J. Rheology, 49, (3), pp. 657-681, (2005).

Eckert, T. et al., "Re-entrant Glass Transition in a Colloid-Polymer Mixture with Depletion Attractions", Phys. Rev. Lett., 89, (12), Art. No. 125701, pp. 125701-1 thru 125701-4, (2002).

Kirby H.K. et al., "Poly(acrylic acid)-poly(ethylene oxide) comb polymer effects on BaTiO3 nanoparticle suspension stability", J. Am. Ceram. Soc., 87, (2), pp. 181-186, (2004).

Li,Q. et al., "Nanoparticle inks for directed assembly of three-dimensional periodic structures", Adv. Mater., 15, (19), pp. 1639-1643, (2003).

D.H. Napper, "Polymeric Stabilization of Colloidal Dispersions", Academic Press, pp. 28-30, (1983).

Zukoski C.F., "Material properties and the electrorheological response", Annu. Rev. Mater. Sci., 23, pp. 45-78, (1993).

Lewis, J.A. et al., "Direct Ink Writing of Three-Dimensional Ceramic Structures", J. Am. Ceram. Soc., 89 [12], pp. 3599-3609, (2006).

Mohraz, A. et al., "Structure and Dynamics of Biphasic Colloidal Mixtures", Phys. Rev. E, 77, Art No. 060403(R), pp. 060403-1 thru 060403-4, (2008).

Croucher, M. et al., "Selective Flocculation in Heterosterically Stabilised Nonaqueous Dispersions", Colloids and Surfaces, 1, pp. 349-360, (1980).

Rao, R. et al., Abstract of Biphasic Nanoparticle Inks for the Direct Writing of 3D Ceramic Structures, Department of Materials Science and Engineering, Univer. Of Ill. at Urbana-Champaign, 1 page, (2006).

Whitby, C.P. et al., "PAA/PEO comb polymer effects on rheological properties and interparticle forces in aqueous silica suspensions", J. of Colloid and Interface Science, 262, pp. 274-281, (2003).

Lewis, J.A. et al., "Direct writing in three dimensions", Materials Today, pp. 32-39, (2004).

Duoss, E.B. et al., "Sol-Gel Inks for Direct-Write Assembly of Functional Oxides", Advanced Materials, 19, pp. 3485-3489, (2007).

Ryu, B-H. et al., "Synthesis of highly concentrated silver nanosol and its application to inkjet printing", Colloids and Surfaces A: Physicochem. Eng. Aspects, 270-71, pp. 345-351, (2005).

Xu, X. et al., "γ-Radiation synthesis of poly(acrylic acid)-metal nanocomposites", Materials Letters, 37, pp. 354-358, (1998).

Magdassi, S. et al., "Silver Nanoparticles as Pigments for Water-Based Ink-Jet Inks", Chem. Mater., 15, pp. 2208-2217, (2003).

Wang, W. et al., "Silver Nanoparticles Capped by Long-Chain Unsaturated Carboxylates", J. Phys. Chem. B, 103, pp. 7238-7246, (1999).

Jana, N.R. et al., "Single-Phase and Gram-Scale Routes toward Nearly Monodisperse Au and Other Noble Metal Nanocrystals", J. Am. Chem. Soc., 125, pp. 14280-81, (2003).

Lin, X.Z. et al. "Direct Synthesis of Narrowly Dispersed Silver Nanoparticles Using a Single-Source Precursor", Langmuir, 19, pp. 10081-10085, (2003).

Wu, R-T. et al., "Preparation of highly concentrated and stable suspensions of silver nanoparticles by an organic base catalyzed reduction reaction", Materials Research Bulletin, 43, pp. 1276-1281, (2008).

Yamamoto, M. et al., "Size-Controlled Synthesis of Monodispersed Silver Nanoparticles Capped by Long-Chain Alkyl Carboxylates from Silver Carboxylate and Tertiary Amine", Langmuir, 22, pp. 8581-8586, (2006).

Fuller, S.B. et al., "Ink-Jet Printed Nanoparticle Microelectromechanical Systems", Journal of Microelectromechanical Systems, 11, pp. 54-60, (2002).

Kim, D. et al., "Direct writing of silver conductive patterns: Improvement of film morphology and conductance by controlling solvent compositions", Applied Physics Letters, 89, pp. 264101-1 thru 264101-3, (2006).

Perelaer, J. et al., "Ink-jet Printing and Microwave Sintering of Conductive Silver Tracks", Advanced Materials, 18, pp. 2101-2104, (2006).

Moon, K-S. et al., "Thermal Behavior of Silver Nanoparticles for Low-Temperature Interconnect Applications", J. Electronic Materials, 34, pp. 168-175, (2005).

Chou, K-S. et al., "Fabrication and sintering effect on the morphologies and conductivity of nano-Ag particle films by the spin coating method", Nanotechnology, 16, pp. 779-784, (2005).

Jones, J. et al., "Stretchable Wavy Metal Interconnects", J. Vacuum Sci. Technol. A, 22, pp. 1723-1725, (2004).

Khang, D-Y. et al., "A Streatchable Form of Single-Crystal Silicon for High Performance Electronics on Rubber Substrates", Science, 311, pp. 208-212, (2006).

Shiraishi, Y. et al., "Oxidation of ethylene catalyzed by colloidal dispersions of poly(sodium acrylate)-protected silver nanoclusters", Colloids and Surfaces A: Physicochemical and Engineering Aspects, 169, pp. 59-66, (2000).

Chapman, R. et al., "Electro-optical shifts in silver nanoparticle films", Chemical Physics Lett., 349, pp. 358-362, (2001).

Pastoniza-Santos, I. et al., "Formation and Stabilization of Silver Nanoparticles through Reduction by N,N-Dimethylformamide", Langmuir, 15, pp. 948-951, (1999).

Cliffel, D.E. et al., "Mercaptoammonium-Monolayer-Protected, Water-Soluble Gold, Silver, and Palladium Clusters", Langmuir, 16, pp. 9699-9702, (2000).

Kuo, P-L. et al., "Formation of Silver Nanoparticles under Structured Amino Groups in Pseudo-dendritic Poly(allylamine) Derivatives", J. Phys. Chem. B, 107, pp. 11267-11272, (2003).

Pal, T. et al., "Reversible Formation and Dissolution of Silver Nanoparticles in Aqueous Surfactant Media", Langmuir, 13, pp. 1481-1485, (1997).

Prasad, B.L.V. et al., "Solvent-Adaptable Silver Nanoparticles", Langmuir, 21, pp. 822-826, (2005).

Chang, J.S. et al., "Optimization of Nanosized Silver Particle Synthesis via Experimental Design", Ind. Eng. Chem. Res., 46, pp. 5591-5599, (2007).

Pyatenko, A. et al., "Synthesis of Spherical Silver Nanoparticles with Controllable Sizes in Aqueous Solutions", J. Phys. Chem. C, 111, pp. 7910-7917, (2007).

Slistan-Grijalva, A. et al., "Synthesis of silver nanoparticles in a polyvinylpyrrolidone (PVP) paste, and their optical properties in a film and in ethylene glycol", Materials Research Bulletin, 43, pp. 90-96, (2008).

Park, J-U. et al., "High-resolution electrohydrodynamic jet printing", Nature Materials, 6, pp. 782-789, (2007).

Gratson, G.M. et al., "Direct writing of three-dimensional webs", Nature, 428, p. 386, (2004).

Toshima, N. et al., "Effect of additional metal ions on catalyses of polymer-stabilized metal nanoclusters", J. of Molecular Catalysis A: Chemical, 177, pp. 139-147, (2001).

Xu, P. "Polymer-ceramic nanocomposites: Ceramic phases", Encyclopedia of Materials: Science and Technology, pp. 1-6, Pergamon Press, (2001).

Caracoche, et al., "Zirconium oxide structures prepared by the sol-gel route: 1, The role of the alcoholic solvent", Journal of the American Ceramics Society, vol. 83, No. 2, pp. 377-384, (2000).

* cited by examiner

SOL-GEL INKS

FEDERALLY SPONSORED RESEARCH OR DEVELOPMENT

The subject matter of this application was in part funded under Contract Number DAAD19-13-1-0227 awarded by the Department of Defense (DOD). The Government may have certain rights in the invention.

BACKGROUND

Three-dimensional structures with micron-scale features have many potential applications, for example as photonic band gap materials, tissue engineering scaffolds, biosensors, and drug delivery systems. Consequently, several assembly techniques for fabricating complex three-dimensional structures with features smaller than 100 microns have been developed, such as microfabrication, holographic lithography, two-photon polymerization and colloidal self assembly. However, all these techniques have limitations that reduce their utility.

Two-photon polymerization is capable of creating three-dimensional structures with sub-micron features, but from precursors that are not biocompatible. Many techniques have been developed to fabricate three-dimensional photonic crystals, but they rely on expensive, complicated equipment or time-consuming procedures. Colloidal self-assembly has also been utilized to make three-dimensional periodic structures, but controlling the formation of defects is difficult.

One fabrication technique relies on the deposition of viscoelastic colloidal inks, usually by a robotic apparatus. These inks flow through a deposition nozzle because the applied pressure shears the interparticle bonds, inducing a breakdown in the elastic modulus. The modulus recovers immediately after leaving the nozzle, and the ink solidifies to maintain its shape and span unsupported regions. The particles in the ink have a mean diameter of about 1 micron, meaning that it would be impossible for the ink to flow through a 1 micron diameter deposition nozzle without clogging or jamming. In practice, nanoparticle inks (mean diameter ~60 nm) also tend to jam nozzles smaller than 30 microns, limiting the applicability of viscoelastic colloidal inks to this length scale.

Another fabrication technique relies on the deposition of polyelectrolyte inks comprising a cationic polyelectrolyte and an anionic polyelectrolyte. Such inks can be worked in filaments with a diameter of the order of 10 microns by flowing through a nozzle and contacting the ink with a deposition bath. The polyelectrolyte ink solidifies in the deposition bath, and three-dimensional structures may thus be manufactured (See U.S. Pat. No. 7,141,617).

Polymeric solutions are used in nature to fabricate thin filaments. Spiders, for example, derive their silk fibers from a concentrated protein biopolymer solution that solidifies as it is drawn to form an extremely strong filament. The extensional flow of the solution aligns liquid crystal sheets in the polymer, and the solution gels by adding ions as it leaves the spinneret. This process was artificially recreated by the deposition of the recombinant spider silk biopolymer into a polar "deposition bath" to produce filament fibers with comparable properties.

SUMMARY

In a first aspect, the invention provides an ink which comprises a metal oxide precursor, a stress reliever, and a solvent.

In a second aspect, the invention provides a method for manufacturing an activated ink, comprising: forming a first ink comprising a metal oxide precursor, a stress reliever, a polymerization inhibitor, and a solvent; hydrolyzing the metal oxide precursor; and optionally evaporating part of the solvent.

In a third aspect, the invention provides a method for fabricating a structure, comprising: forming a first ink comprising a metal oxide precursor, a stress reliever, a polymerization inhibitor, and a solvent; hydrolyzing the metal oxide precursor; and optionally evaporating part of the solvent, thus obtaining an activated ink; flowing the activated ink through a nozzle, to form a structure; and heating the structure in an oxidizing atmosphere.

BRIEF DESCRIPTION OF THE DRAWINGS

The invention can be better understood with reference to the following drawings and description.

FIG. 9a shows a scanning electron micrograph of a single layer $TiO_2$ structure.

FIG. 9b shows a scanning probe microscopy profile of the single layer $TiO_2$ structure of FIG. 9a.

FIG. 10a-c show scanning electron micrographs of a 24 layer woodpile structure as-patterned, heated to 715° C., and an ion beam-milled cross-section, respectively.

FIG. 10d shows optical reflectivity data of the 24 layer woodpile structure of FIG. 10a.

DETAILED DESCRIPTION

The present invention takes advantage of the discovery that sol-gel inks comprising a stress reliever solidify rapidly upon extrusion and do not crack during the subsequent conversion to metal oxides by drying and thermal annealing. Without being bound to any particular theory, it is believed that the stress reliever ensures a crack-free adhesion to substrates. Ink compositions with stress relievers can be used in the fabrication of micron- and nano-scale metal oxide structures via deposition of sol-gel inks. The inks comprise a metal oxide precursor, a stress reliever, an optional polymerization inhibitor and a solvent.

The metal oxide precursor can be selected from those commonly known in the art, for instance precursors used in the production of ceramics, spin coating and chemical vapor deposition. Useful metal oxide precursors include soluble compounds of the transition metals. Particularly useful are organometallic metal oxide precursors such as alkoxides, alcoholates, acetylacetates and carboxylates; water-soluble metal oxide precursors such as acetates, halides and nitrates are also useful.

Preferred metal oxide precursors are the alkoxides of transition metals such as Ti, Zn, Sn, Zr, Ni, Pb, Sr and Hf. Metal oxide precursors containing transition metals such as Nb, Ta, Al, Sn, Fe, Ce and Y are especially useful for the addition of dopants or minority phases. Non-transition metals, for example Ba, Al and Si can also be used. Other metal complexes, such as metal acetates and other metal carboxylates, and metal acetylacetonates may also be used as metal oxide precursors. Specific example metal oxide precursors include: $Ti(i-Pro)_2(acac)_2$, $Ti(t-BuO)_4$, $Ti(i-Pro)_4$, $Si(OEt)_4$, $Zr(COOCH_3)_4$, $Mg(COOCH_3)_2$, $Y(C_5H_7O_2)_3$, $Pt(C_5H_7O_2)_2$, $SrCO_3$, $(NH_4)_x(WO_4)_y$, $Cu(C_5H_7O_2)_2$, $Nd(C_5H_7O_2)_3$, $Ni(C_5H_7O_2)_2$, $Co(C_5H_7O_2)_2$, $V(C_5H_7O_2)_3$, $Pd(C_5H_7O_2)_2$, $MgSO_4$, $AgNO_3$, $AlNO_3$, $ZnCl_2$, $ZrOCl_2$, $ZrO(OH)Cl$ and $MgCl_2$.

The stress reliever is a polymer that can form electrostatic interactions and hydrogen bonds with electropositive groups (such as hydroxyls), for example the electropositive groups of metal-containing polymers. The stress reliever is incorporated within the ink as a processing aid, to both enhance its viscosity and relieve stresses that occur during drying and annealing of the as-patterned structures. Polyketones, polyamides, polyalcohols, polyamines, polythiols, polyethers and polymers comprising heterocyclic side-chains constitute representative genera of such polymers. Particularly preferred are polyvinylpyrrolidone (PVP), poly(N,N-dimethylacrylamide) (PDMAAm), poly(2-methyl-oxazoline) (POZO), poly (ethylene glycol) (PEG), poly(propylene glycol) and poly (vinyl alcohol) (PVA). The mass average molecular weight Mw of the polymer can vary according to the needs of the application at hand. Preferred Mw's vary from 5,000 to 150,000.

The polymerization inhibitor is optionally added to the composition in order to slow the polymerization of the metal oxide precursor and gelling. The inhibitor is preferably a chelating agent such as the bidentate, tridentate, tetradentate and more generally multidentate ligands ordinarily used in sol-gel processing. Example ligands include diketones, β-diketones, triketones, diacids, triacids, diamines, triamines, diols and triols, such as acetylacetonate, tropolone, diethanolamine, triethanolamine, triethylenetetramine and citric acid. In certain instances, the metal oxide precursor includes chelating agents as part of the precursor molecule, as is the case for Ti(i-Pro)2(acac)2, and a polymerization inhibitor may be omitted. When the metal oxide precursor does not contain chelating agents, the polymerization inhibitor may be reacted with the metal oxide precursor prior to mixing other components of the ink together.

The solvent is selected from those commonly used in sol-gel preparations, for example alcohols, ketones and other organic solvents. Preferred solvents include methanol, ethanol, isopropanol and butanol.

Additional organic and inorganic species can also be incorporated into the inks, to amounts that do not deleteriously affect the rheological properties of the ink. Examples include dopants, nanoparticles, quantum dots, charge neutral polymers and other metal oxide precursors.

Once the components of the ink have been mixed together, the polymerization of the metal oxide precursor is initiated. This can be achieved by catalyst-assisted hydrolysis, for instance by the addition of water and an acid, for example hydrochloric acid (HCl), acetic acid or trifluoroacetic acid. The hydrolysis can also be catalyzed by a base, for example sodium hydroxide, potassium hydroxide and/or ammonium hydroxide. However, certain precursors such as acetates, other carboxylates, and acetylacetonates, tend to be insufficiently reactive in the presence of an acid or base alone. This shortcoming can be addressed by the addition of an oxidant such as hydrogen peroxide ($H_2O_2$), a peracid or other reactive oxygen species such as nitrous oxide (NO) or superoxide ($O_2^-$), where the oxidant may be added on its own or in the presence of an acid. Without being bound by any particular theory, it is believed that the oxidant speeds up hydrolysis and condensation reactions and in some cases drives reactions that probably would not occur otherwise.

Following the polymerization, if the mixture is insufficiently viscous for the intended application, the solvent is evaporated until the desired viscosity is reached, that is in the range $0.01 \leq \eta \leq 100$, where $\eta$ is expressed in Pa·s. Though viscous, the product activated ink is flowable through micronozzles, and is characterized by a sufficient average molecular weight to form a continuous filament shape upon deposition.

As the activated ink flows through a fine deposition nozzle with a diameter as small as 0.1 microns, without clogging or jamming, it allows for micron size control of molding and extrusion to produce solid structures of metal oxides, for example titania ($TiO_2$), zirconia ($ZrO_2$), indium tin oxide (ITO), barium titanate ($BaTiO_3$) and zinc oxide ($ZnO_2$). Such structures may be manufactured according to micron-scale fabrication methods described in U.S. Pat. No. 7,141,617. An applied pressure forces the activated ink through a deposition nozzle that is attached to a moving x-y-z micropositioner onto a substrate. The nozzle then incrementally rises in the z (vertical) direction for the next layer of the pattern. This process is repeated until the desired three-dimensional structure has been created. With this technique, any three-dimensional structure can be defined and fabricated.

After the one-dimensional, two-dimensional and three-dimensional structure is formed from the activated ink, the structure is thermally annealed to facilitate conversion to the desired phase of titania, zirconia, or other desired metal oxide or mixed metal oxide. The substrate with the structure is placed in a programmable oven and heated in an oxidizing atmosphere, for instance air or pure oxygen, until organic burnout and crystallization are complete.

The activated ink may be used in several settings, for instance in the production of rapid-setting protective films, as well as the extrusion or molding from the nano to the macro scale, such as in the rapid manufacture of prototypes. The structures are useful for many applications including photonic crystals, photonic band gap materials, sensors, membranes, transparent conductors, ferroelectric devices, catalyst supports and oxide conductors.

EXAMPLES

Titania Ink 0.31 g of polyvinylpyrrolidone (PVP, Mw~55,000) (Sigma-Aldrich Corp., St. Louis, Mo.) were dissolved in 3.1 g of ethanol (200 proof, Aaper Alcohol and Chemical Company, Shelbyville, Ky.) in a vial. 6.25 g of $Ti(i-Pro)_2(acac)_2$ (TIAA) as a 75% solution in isopropanol (Sigma-Aldrich Corp., St. Louis, Mo.) was added to the mixture and stirred for 10 minutes. 0.62 g of 15M ammonium hydroxide (Fisher Scientific International Inc., Fairlawn, N.J.) were mixed with 0.94 g of nanopure water (Millipore Direct-Q Ultrapure Water System, Millipore Corporation, Billerica, Mass.) and 3.1 g of ethanol, and the resulting solution was slowly added to the above solution of PVP and TIAA in ethanol. The vial was then heated at 60° C. for 8-16 hours until evaporation down to a viscous, concentrated material that was transparent and brownish orange in color. The viscosity could be adjusted by addition or removal of ethanol.

Titania-doped Ink

The titania inks were n-doped with niobium and tantalium and p-doped with aluminum and iron. The tested doping levels ranged from 1 to 5 mol %. The doping was generally performed with alkoxide or acetylacetonate derivatives of the dopants.

The dopant precursor was added to the TIAA before any other reactions were performed. Doping was also performed with tin acetylacetonate dichloride which provide to favorable for inhibiting grain growth in the rutile phase.

Zirconia Ink

A zirconia precursor solution was prepared from $Zr(OC_4H_9)_4$ (Sigma-Aldrich Corp., St. Louis, Mo.), ethanol, nanopure water, PVP and concentrated ammonium hydroxide. The precursor solution was heated at 75° C. while stirring for about 12 hours. The heating resulted in an orange viscous solution ($\eta$~1 Pa·s). The solution was used for deposition without further processing.

Indium Tin Oxide (ITO) Ink

An indium and tin stock solution was prepared by dissolving 20 g of indium acetate $In(Ac)_3$ in 100 g of acetylacetone at a temperature of 60° C. $Sn(acac)_2(Cl)_2$ was dissolved into the mixture as Sn/In=0.08 mole ratio. The mixture was stirred overnight at 60° C. After stirring overnight, 10 g of 30 wt % hydrogen peroxide solution was added drop-wise and stirred at 60° C. for 3 hours. A third and final 10 g of 30 wt % hydrogen peroxide solution was added drop-wise and stirred at 60° C., overnight, yielding an In/Sn stock solution.

The final ink was prepared by taking 5 g of the In/Sn stock solution and adding PVP with a Mw of 55,000. The quantity of added PVP was 10 wt % with respect to the $In_2O_3$. The ink was then concentrated at 60° C. for about 3 hours.

Direct Writing of Sol-gel Inks

The titania ink was poured into a 3 ml plastic syringe. A small plastic stopper was added to the back of the syringe to facilitate the application of air pressure from a hose attachment. A pulled-glass syringe tip with a luer-lock fitting was inserted and the entire syringe was placed in a holder attached to a caster. A substrate was placed on a stand, and the syringe was manually aligned with the substrate. The substrate could be glass, silicon or gold. A user defined CAD program designating a two-dimensional or three-dimensional pattern was loaded into a RoboCAD program. Air pressure was applied and the ink began to move down the tip shaft. Just prior to the ink exiting the tip, the RoboCAD program was initiated such that the needle was moving through the prepattern as the ink began to extrude. The height of the tip was optimized during the prepattern, and the three-dimensional pattern was subsequently deposited.

The high mass loading (80% or more) and the evaporation of solvent upon ink extrusion allowed the ink to maintain its shape and produce three-dimensional structures. The deposition speed (V) and height between layers (z) were controlled by the software, and the applied pressure (P) was controlled manually with a pressure meter. Typical conditions for the assembly of structures through a 1 micrometer were P=30 psi, V=100-1600 micrometers/second and z=1 micrometer.

Figure 1:
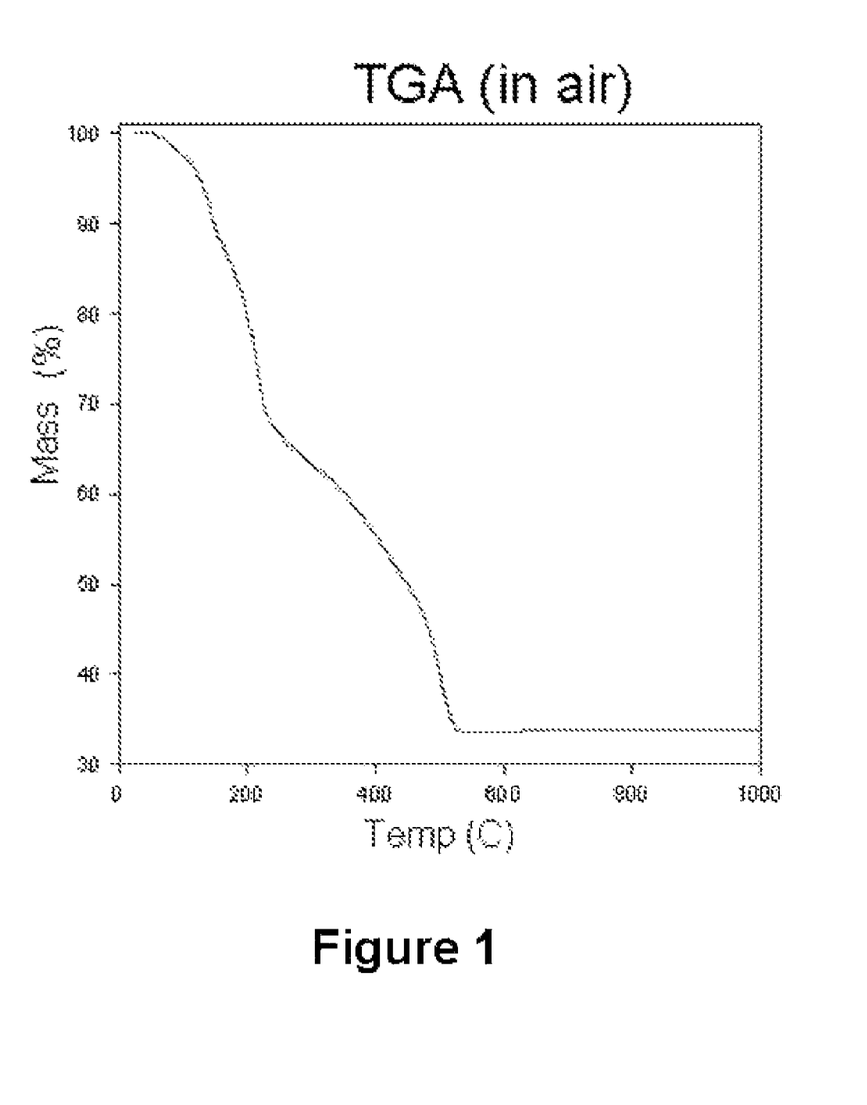
FIG. 1 shows the thermogravimetric analysis (TGA) of a titania-based ink heated in air.
Figure 2:
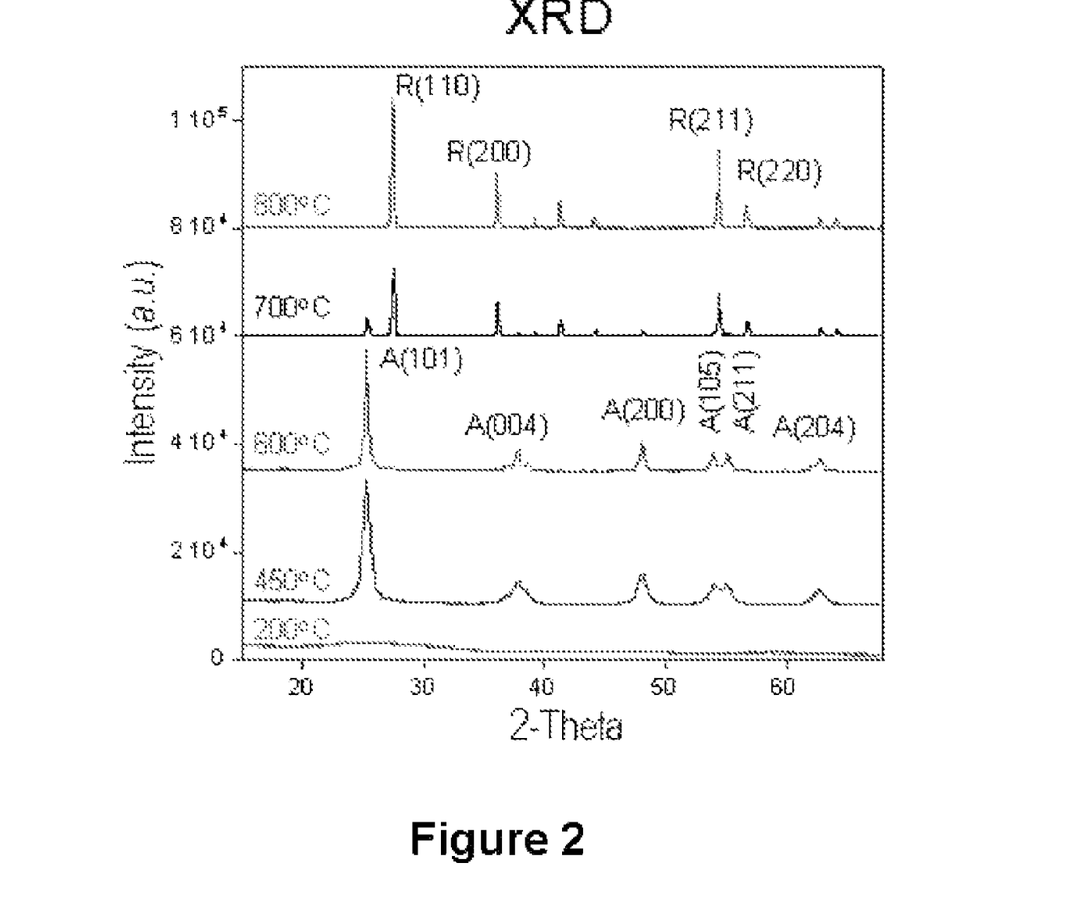
FIG. 2 shows the XRD profile of a titania-based ink thermally annealed at several different temperatures in air.
Figure 3:
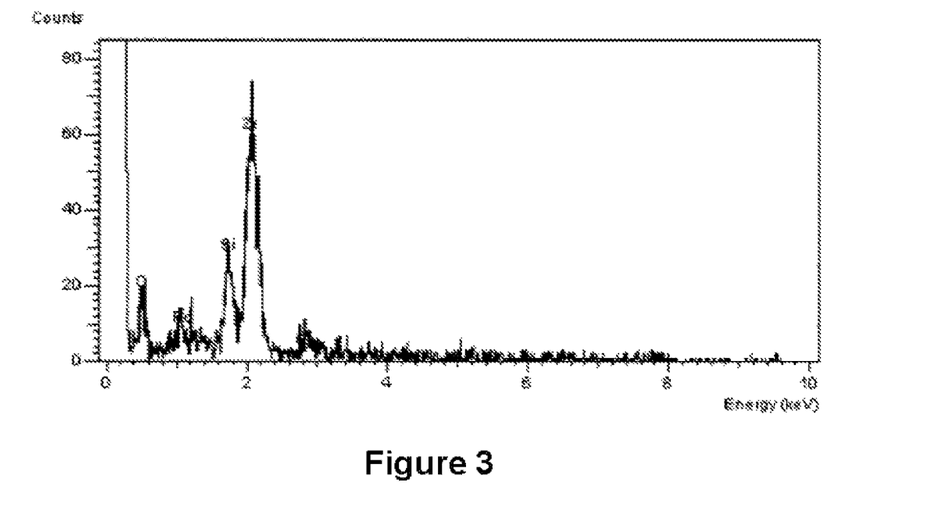
FIG. 3 shows the XRD profile of a thermally annealed zirconia-based ink.
Figure 4:
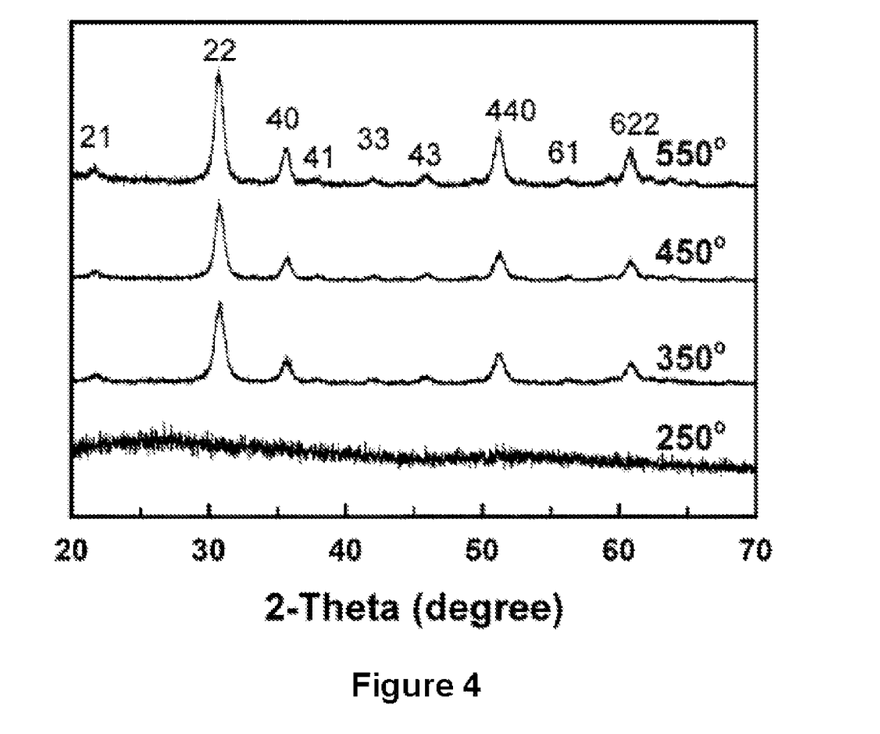
FIG. 4 shows the XRD profile of an indium tin oxide-based ink thermally annealed at several different temperatures in air.

After the one-dimensional, two-dimensional and three-dimensional pattern was drawn, the structure was thermally annealed to facilitate conversion to the desired phase of titania, zirconia, or other desired metal oxide or mixed metal oxide. The substrate with the pattern was placed in a programmable oven and heated until organic burnout and crystallization were complete. Structures were heated under air or oxygen atmosphere. The imaging of the structures was carried out by means of a scanning electron microscope (Hitachi S-4700 High Resolution Electron Microscope). Thermogravimetric analysis (TGA) of the titania ink showed a mass loss of about 66% by 500° C.; complete organic decomposition occurs by 525° C. (FIG. 1). This corresponded well with X-ray diffraction (XRD) data in which peaks characteristic of anatase began appearing at 450° C. According to the XRD data, phase transformation of titania to anatase was complete by 600° C. and rutile was complete by 800° C. (FIG. 2). XRD data for the zirconia ink (FIG. 3) and the ITO ink (FIG. 4) evidenced similar transformations for such inks upon heating.

Figure 5:
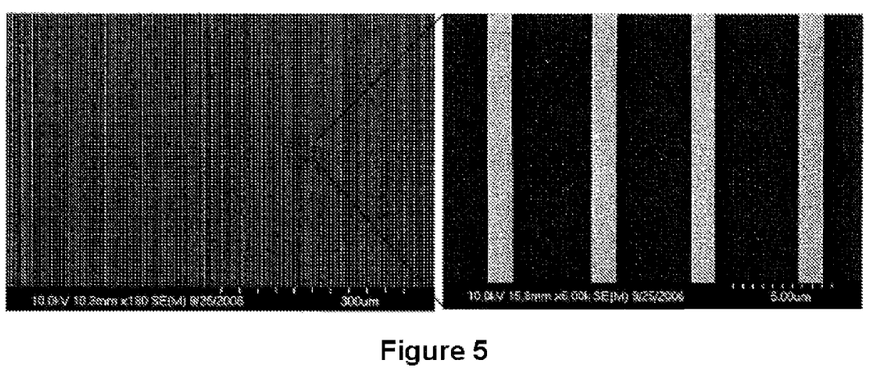
FIG. 5 shows a scanning electron micrograph of a two-dimensional structure obtained with a titania ink after thermal annealing.
Figure 6:
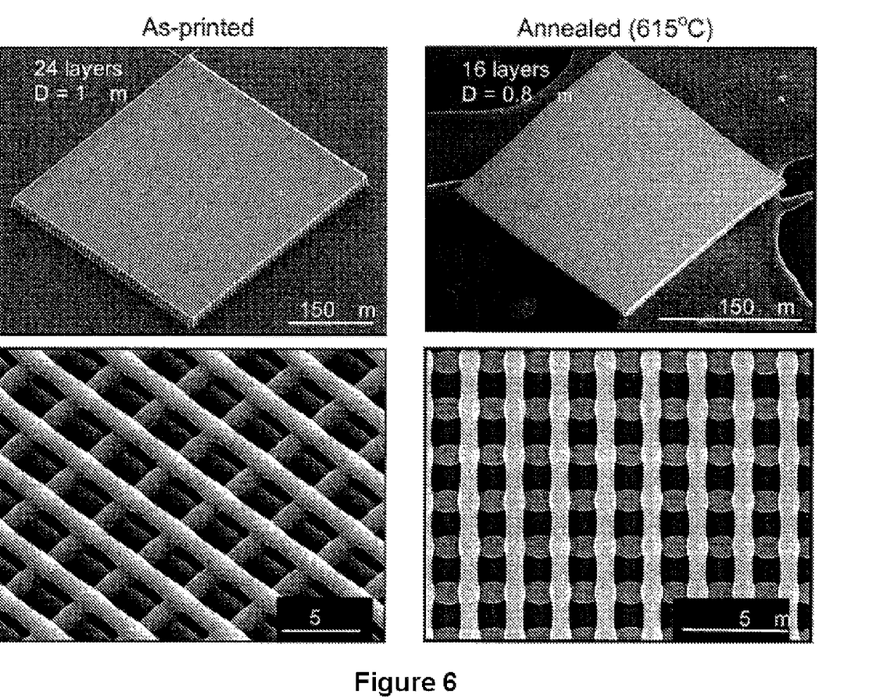
FIG. 6 shows scanning electron micrographs of two three-dimensional structures of titania-based ink.
Figure 7:
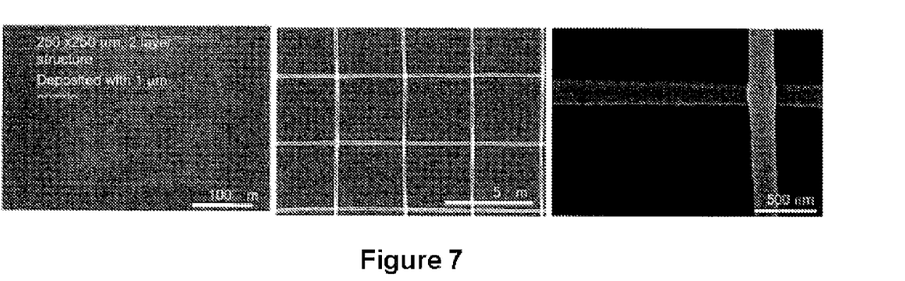
FIG. 7 shows scanning electron micrographs of 2 layer patterned zirconia structures.
Figure 8:
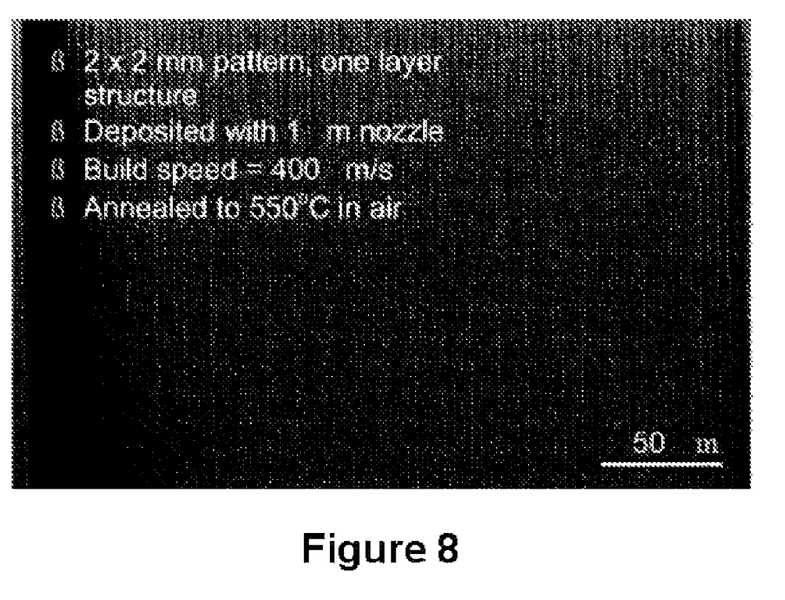
FIG. 8 shows a scanning electron micrograph of a one-dimensional patterned ITO structure.

FIG. 5 includes the scanning electron micrograph of a two-dimensional structure obtained with the titania ink after annealing at 600° C. The micrographs of two three-dimensional structures of titania ink are set forth in FIG. 6. The structure on the left has 24 layers and was imaged as-printed. The structure on the right has 16 layers and was pictured after annealing at 615° C. Depicted on FIG. 7 are 2 layer patterned zirconia structures, imaged at a scale of 100 micrometers, 5 micrometers and 500 nanometers, respectively. A one-dimensional patterned ITO structure, annealed at 550° C. in air, is depicted in FIG. 8.

$TiO_2$ Single Layer Pattern And 3 D Woodpile

Ink Synthesis

A $TiO_2$ precursor solution was prepared from titanium diisopropoxide bis(acetylacetonate) (TIAA) (75 wt % in 2-propanol, Sigma-Aldrich Corporation, St. Louis, Mo.), absolute ethanol (EtOH) (200 proof, Aaper Alcohol and Chemical Company, Shelbyville, Ky.), nanopure water (Millipore direct-q ultrapure water system, Millipore Corp., Billerica, Mass.), concentrated ammonium hydroxide (14.8 N, Fisher Scientific International Inc., Fairlawn, N.J.), and polyvinylpyrrolidone (PVP) (Mw=55000, Sigma-Aldrich Corporation, St. Louis, Mo.), in a 4.6:48.6:18.5:1.8:1 mole ratio, respectively (with respect to the repeat group of PVP). All chemicals were used as received for ink formulation. PVP was dissolved in half the final quantity of EtOH while stirring. After dissolution, TIAA was added drop-wise to the PVP/EtOH mixture. The remaining EtOH, $H_2O$, and $NH_4OH$ were mixed and then added drop-wise to the TIAA/PVP/EtOH mixture. The $TiO_2$ precursor solution was heated at 70° C. while stirring for ~18 hours. This step allowed the isopropoxide groups to react while simultaneously evaporating solvent, leading to an orange/brown, viscous solution ($\eta$~2-6 Pa·s). The $TiO_2$ precursor ink was direct written without further processing.

Rheology

A $TiO_2$ precursor solution was prepared in the normal manner for each data point. The mass of the vial, cap, label, and stir bar (VCLS) were recorded. The mass of each component was also recorded. The solutions were evaporated to the desired concentration and the final mass of the VCLS and solution were recorded. The Ti+PVP concentration (wt %) was calculated assuming no evaporation of Ti and PVP. Each vial was sealed with its cap and parafilm until rheological analysis was performed. The apparent viscosities were measured as a function of shear rate (10-300 $s^{-1}$) in ascending steps with a stress, strain, and shear rate control rheometer (C-VOR, Malvern Instruments, Malvern UK) using a coaxial cylinder (C8, bob diameter of 8 mm and an inter-cylinder distance of 0.4 mm). All measurements were taken at a controlled temperature of 25° C. All solutions below Ti+PVP=26 wt % exhibited Newtonian flow behavior in this shear range whereas the onset of shear-thinning occurred above Ti+PVP=26 wt % (not shown). For each solution, the apparent viscosity value closest to a shear rate of 110 $s^{-1}$ (actual range=107-121 $s^{-1}$) was selected and plotted vs. Ti+PVP wt %.

Ink and Structure Characterization

X-ray diffraction (XRD) was used to determine the crystalline phase of annealed thick films of ink crushed into powder (D-Max x-ray diffractometer, Rigaku International Corp., Tokyo, Japan). A fixed anode Cu source with monochromatic K$\alpha$ radiation was used. Crystallite sizes and phase wt % were determined using Jade X-ray analysis software (Materials Data, Inc., Livermore, Calif.). Thermogravimetric analysis (TGA) was performed under flowing air on an ink sample to determine the mass loss due to solvent evaporation and the decomposition of organic constituents (Mettler Toledo TGA/SDTA851). Scanning electron microscopy (SEM) images were obtained with a Hitachi S-4700 scanning electron microscope (Hitachi, Ltd., Tokyo, Japan). Height profiles were generated using contact-mode, scanning probe microscopy (SPM) (Dimension 3100 scanning probe microscope, Veeco Instruments, Inc., Woodbury, N.Y.). Focused ion beam milling (Strata DB 235 FIB, FEI Co., Hillsboro, Oreg.) was used to obtain cross-sectional images of the annealed $TiO_2$ woodpile.

For the single layer pattern statistics, the rod width (w) was measured from SEM micrographs (top view) of 60 rods measured 3 times each at 15 different locations throughout the sample (4 rods in each location). The rod center-to-center spacing (d) was determined from 45 spacings measured 3 times each from the same 15 locations. The rod height (h) was determined from SPM line scans of 84 rods at 10 different locations (8-9 rods in each location). For the as-printed woodpile, 12 measurements (6 each in x- and y-directions) of the top 4 layers were taken to obtain w and d values. For the annealed woodpile, 28 measurements (14 in each direction) from the top 4 layers were measured from 7 locations to obtain w and d values. The pattern edge length was calculated from 12 measurements (6 in each direction), all from distinct locations. For all statistical measurements, the values were averaged and the standard error calculated.

Single Layer Pattern and 3D Woodpile Fabrication

The $TiO_2$ precursor ink was loaded into a 3 mL plastic syringe barrel with piston (EFD Inc., East Providence, R.I.). A pre-pulled borosilicate glass micronozzle (P-2000 laser based micropipette puller, Sutter Instrument Co., Novato, Calif.) with 1 µm diameter opening was attached to the barrel by luer-lok. This ink delivery system was mounted on a three-axis micropositioning stage (ABL 900010 x-y-z motion stage, Aerotech, Inc., Pittsburgh, Pa.) controlled with custom computer-aided-design software (RoboCAD, James E. Smay, Stillwater, Okla.). Single layer and 3D woodpile pattern programs were designed with in-house software (G code generator, Mingjie Xu, Urbana, Ill.). An air-powered fluid dispenser (800 ultra dispensing system, EFD Inc.) was attached to the deliver system to pressurize the barrel and control flow rate. The required pressure for ink flow varied according to ink viscosity and build speed, but generally ranged from 275-550 kPa.

Single layer patterns were constructed on a double-polished silicon wafer. The single layer pattern used a build speed=1600 µm s$^{-1}$, d=2 µm, and pattern area of 2000×2000 µm. The build time for this structure was 20 min 58 s. Multilayer assembly occurred on a sacrificial layer of Crystalbond™ 509—(Structure Probe, Inc., West Chester, Pa.) coated silicon wafers. Crystalbond was dissolved in acetone (15 wt %) and spin coated onto wafers at 2500 rpm for 1 min (P-6000 spin coater, Integrated Technologies, Inc., Acushnet, Mass.). For a typical 24 layer structure with build speed=400 µm s$^{-1}$, d=4 µm, and pattern area=300 µm×300 µm, the build time was 23 min 26 s. All structures were built at a controlled relative humidity of 18-35% at 20-25° C. After completion, structures were stored in a desiccator until further processing.

All as-printed structures were thermally annealed in air in a box furnace (Lindberg/Blue M 894, Thermo Electron Corp., Asheville, N.C.) to remove the organic constituents and form the desired $TiO_2$ crystalline phase. For the single layer pattern, a heating profile of 2° C. min$^{-1}$ to 515° C., 1 h hold, 5° C. min$^{-1}$ to 615° C., 1 h hold was used. A heating profile of 2° C. min$^{-1}$ to 515° C., 1 h hold, 5° C. min$^{-1}$ to 715° C., 1 h hold was used for the multilayer pattern. During annealing, a silicon wafer is placed on top of the structure as a precaution to prevent warping.

Figure 9:
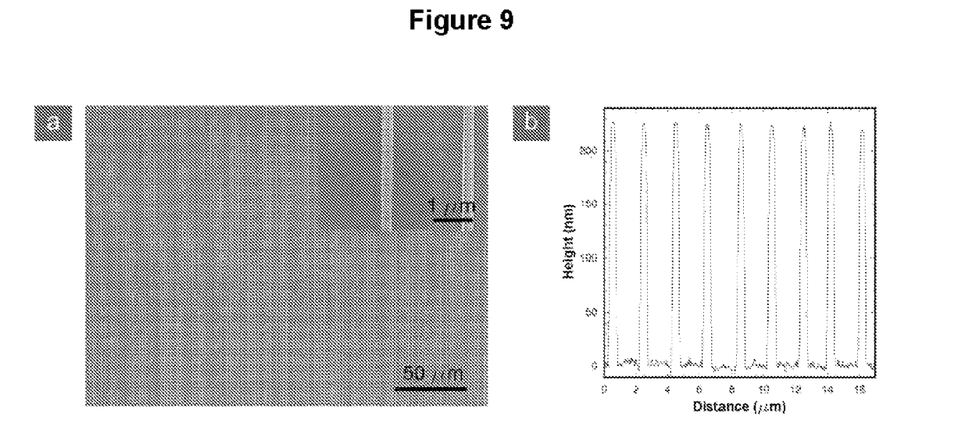

The patterning of 1 D micro-periodic arrays was composed of parallel ink filaments (or rods) by direct writing of this TIAA-based ink through a micron-sized deposition nozzle. A representative structure consisting of $TiO_2$ (anatase) rods is shown in FIG. 9a. These filamentary features remain pinned to the substrate surface throughout the annealing process; hence, their shrinkage occurs radially. The height profile data, shown in FIG. 9b, reveals that these rods have an average width (w)=268±1 nm, average height (h)=223±1 nm, and an average center-to-center separation (d)=1.977±0.007 µm.

Figure 10:
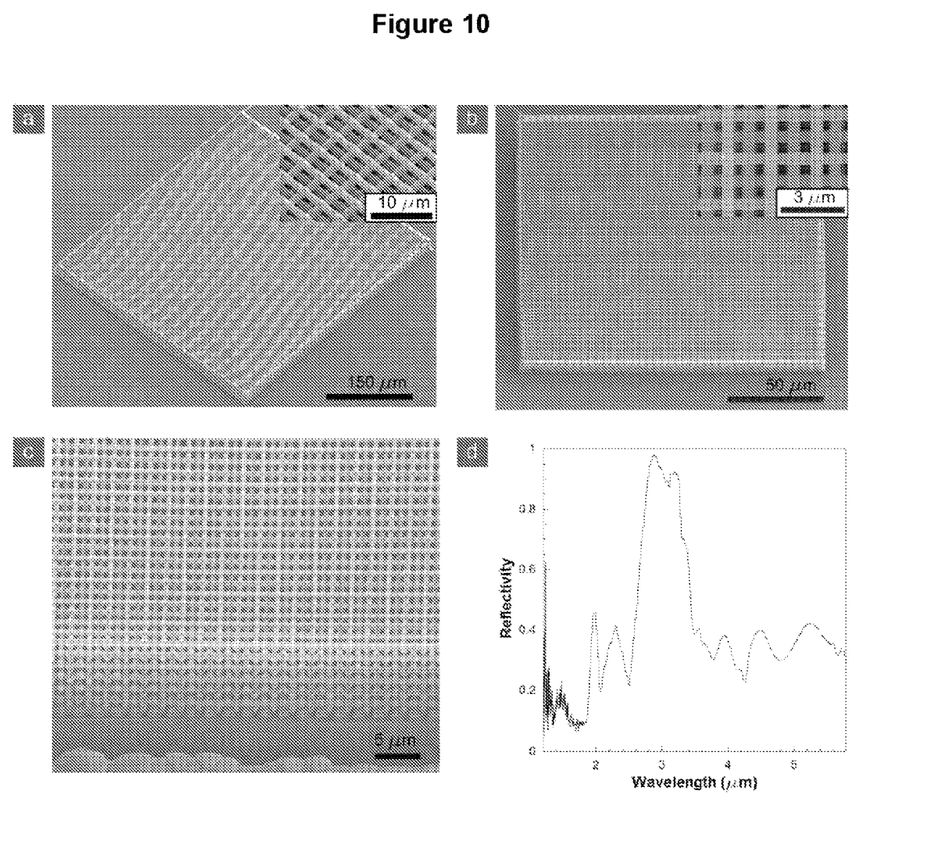

A representative, as-patterned 3 D woodpile structure is shown in FIG. 10a. From the inset, we find that the rods (w=1.212±0.002 µm) are bonded to one another and span gaps (d=4.002±0.004 µm) between underlying rods. During annealing these 3 D structures, only the first layer is pinned to the substrate surface. Hence, rods in subsequent layers will not only contract radially, but laterally as well. If the first layer remains pinned throughout the annealing process, these structures experience anisotropic shrinkage that may lead severing of the first layer, or even worse, cracking and warping. To overcome such difficulties, the ink is printed onto substrates coated with a sacrificial layer. Early in the annealing process, this sacrificial layer melts allowing the patterned 3 D structure to debond from the underlying surface and shrink isotropically. A representative $TiO_2$ structure (24-layer) annealed in this fashion to 715° C. in shown in FIG. 10b. The final 3 D structure possesses an edge length of 157.90±0.08 µm (reduced from an initial value of 300 µm), w=520±1 nm, and d=2.10±0.01 µm (reduced from an initial value of 4 µm). Excellent registration is observed in both the higher magnification image shown in FIG. 10b (inset) as well as the focused ion beam (FIB)-milled cross-section shown in FIG. 10c.

Spectroscopy

A Fourier-transform infrared spectrometer (FTIR) (Bruker Vertex 70, globar lamp, Billerica, Mass.) combined with an infrared microscope (Bruker Hyperion 2000) and liquid nitrogen cooled InSb detector was used to measure reflectance spectra of 3 D woodpiles. Samples were viewed and measured with a 15× Cassegrain objective (numerical aperture=0.4) that probed the sample surface at an angle centered about 16.7° with respect to sample normal. A circular, knife-edge aperture with a 20 µm diameter was placed in the light path of the microscope. Spectra were normalized to a gold mirror. In order to avoid edge effects, the center areas of the samples were measured and no significant variations in optical performance were displayed within these regions of the samples.

A straightforward way to confirm the registration quality is to probe the optical properties of this 3 D micro-periodic $TiO_2$ structure. This woodpile displays an exceptionally large reflectance peak (98% at $\lambda$=2.9 µm) (FIG. 10d), indicating a highly ordered structure. The magnitude of the stop-peak is a consequence of the large refractive index (n) contrast between $TiO_2$ and air ($n_{air}$~1.0). XRD analysis of inks annealed to 715° C. reveal their composition to be a mixture of TiO$_2$ anatase (47.3 wt %) and rutile (52.7 wt %) phases. Thus, the filaments have an approximate n of 2.6 by a simple rule of mixtures analysis, which is above the theoretical minimum of n=1.9 required to open a complete PBG in a woodpile structure. Annealing to higher temperatures was avoided to prevent the significant grain growth and surface roughness that result upon forming the rutile phase.

While various embodiments of the invention have been described, it will be apparent to those of ordinary skill in the art that other embodiments and implementations are possible within the scope of the invention. Accordingly, the invention is not to be restricted except in light of the attached claims and their equivalents.

REFERENCES

1. Langmuir, Vol. 18 (2002), p. 5429.
2. Advanced Materials, Vol. 14 (8) (2002), 1279.
3. Biomaterials, Vol. 26 (2005), p. 5632.
4. Nature, Vol. 414 (2001), p. 289.
5. Nature, Vol. 394 (1998), p. 251.
6. Nature, Vol. 404 (2000), p. 53.
7. Nature Materials, Vol. 3 (2004), p. 444.
8. NanoLetters, Vol. 6 (2006), p. 2009.
9. NanoStructured Materials, Vol. 4 (6) (1994), p. 663.
10. Applied Physics Letters, Vol. 75 (1999), p. 3789.

What is claimed is:

1. A sol-gel ink for flowing through a deposition nozzle to form metal oxide structures, the sol-gel ink comprising:
a metal oxide precursor comprising at least one member selected from the group consisting of Ti, Sn, Zr, and In;
a polyvinylpyrrolidone stress reliever;
a solvent;
optionally a polymerization inhibitor; and
further comprising a stress reliever selected from the group consisting of poly(N,N-dimethylacrylamide), poly(2-methyl-oxazoline), poly(ethylene glycol), poly(propylene glycol), poly(vinyl alcohol) and mixtures thereof;
wherein the sol-gel ink maintains its shape upon extrusion through the deposition nozzle.

2. The sol-gel ink of claim 1, wherein the metal oxide precursor is selected from the group consisting of Ti(i-Pro)$_2$(acac)$_2$, Ti(t-BuO)$_4$, Ti(i-Pro)$_4$, In(Ac)$_3$, Sn(acac)$_2$Cl$_2$, Zr(COOCH$_3$)$_4$, Zr(OC$_4$H$_9$)$_4$, ZrOCl$_2$, ZrO(OH)Cl and mixtures thereof.

3. The sol-gel ink of claim 2, wherein the metal oxide precursor is selected from the group consisting of Ti(i-Pro)$_2$(acac)$_2$, Zr(OC$_4$H$_9$)$_4$, In(Ac)$_3$, Sn(acac)$_2$Cl$_2$ and mixtures thereof.

4. The sol-gel ink of claim 1, wherein the polyvinylpyrrolidone stress reliever has a mass average molecular weight, Mw, of 5,000 to 150,000.

5. The sol-gel ink of claim 1, wherein the sol-gel ink comprises the polymerization inhibitor selected from the group consisting of diketones, β-diketones, triketones, diacids, triacids, diamines, triamines, diols, triols and mixtures thereof.

6. The sol-gel ink of claim 1, wherein the sol-gel ink comprises the polymerization inhibitor selected from the group consisting of acetylacetonate, tropolone, diethanolamine, triethanolamine, triethylenetetramine, citric acid and mixtures thereof.

7. The sol-gel ink of claim 1, wherein the sol-gel ink has a viscosity of 0.01 Pa·s to 100 Pa·s.

8. The sol-gel ink of claim 1, wherein:
the metal oxide precursor is selected from the group consisting of Ti(i-Pro)$_2$(acac)$_2$, Zr(OC$_4$H$_9$)$_4$, In(Ac)$_3$, Sn(acac)$_2$Cl$_2$ and mixtures thereof, and
the solvent is selected from the group consisting of ethanol, acetylacetone and mixtures thereof.

9. The sol-gel ink of claim 1, wherein the metal oxide precursor comprises a hydrolyzed metal oxide precursor.

10. A sol-gel ink for extruding through a deposition nozzle to form metal oxide structures, the sol-gel ink comprising:
a metal oxide precursor comprising Ti;
a polyvinylpyrrolidone stress reliever;
a solvent; and
optionally a polymerization inhibitor,
wherein a concentration of the metal oxide precursor and a concentration of the stress reliever are sufficient for the sol-gel ink to exhibit shear-thinning flow behavior at shear rates between 10 s$^{-1}$ and 300 s$^{-1}$.

11. A method for manufacturing a sol-gel ink for extruding through a deposition nozzle, the method comprising:
forming an ink precursor comprising a metal oxide precursor, the metal oxide precursor comprising at least one member selected from the group consisting of Ti, Sn, Zr, and In; a polyvinylpyrrolidone stress reliever; a solvent; optionally a polymerization inhibitor; and further comprising a stress reliever selected from the group consisting of poly(N,N-dimethylacrylamide), poly(2-methyl-oxazoline), poly(ethylene glycol), poly(propylene glycol), poly(vinyl alcohol) and mixtures thereof;
hydrolyzing the metal oxide precursor; and
evaporating part of the solvent to form a sol-gel ink that maintains its shape upon extrusion through the deposition nozzle.

12. The method of claim 11, further comprising adding an acid to the ink precursor.

13. The method of claim 12, wherein the acid is selected from the group consisting of hydrochloric acid, acetic acid and trifluoroacetic acid.

14. The method of claim 11, further comprising adding a base to the ink precursor.

15. The method of claim 14, wherein the base is selected from the group consisting of sodium hydroxide, potassium hydroxide, ammonium hydroxide and mixtures thereof.

16. The method of claim 11, further comprising addition of an oxidant to the ink precursor.

17. The method of claim 16, wherein the oxidant is selected from the group consisting of hydrogen peroxide, a peracid, nitrous oxide, superoxide and mixtures thereof.

18. The method of claim 16, wherein the oxidant is hydrogen peroxide.

19. A method for fabricating a structure, comprising:
extruding a sol-gel ink through a nozzle to form a structure, the sol-gel ink maintaining its shape upon extrusion through the nozzle and heating the structure in an oxidizing atmosphere, where the sol-gel ink comprises:
a metal oxide precursor;
a polyvinylpyrrolidone stress reliever;
a solvent;
optionally a polymerization inhibitor; and
wherein the sol-gel ink further comprises a stress reliever selected from the group consisting of poly(N,N-dimethylacrylamide), poly(2-methyl-oxazoline), poly(ethylene glycol), poly(propylene glycol), poly(vinyl alcohol) and mixtures thereof.

20. The method of claim 19, wherein the nozzle is a micron-sized deposition nozzle having a diameter as small as 0.1 micron.

21. The method of claim 19, wherein the structure is a two-dimensional structure comprising a single layer.

22. The method of claim 19, wherein the structure is a three-dimensional structure comprising a plurality of layers.

23. A sol-gel ink consisting essentially of:
   a metal oxide precursor comprising at least one member selected from the group consisting of Ti, Sn, Zr, and In;
   a polyvinylpyrrolidone stress reliever;
   a solvent;
   a polymerization inhibitor; and further comprising a stress reliever selected from the group consisting of poly(N,N-dimethylacrylamide), poly(2-methyl-oxazoline), poly(ethylene glycol), poly(propylene glycol), poly(vinyl alcohol) and mixtures thereof.

24. A method for manufacturing a sol-gel ink, comprising:
   forming the ink of claim 23;
   hydrolyzing the metal oxide precursor; and
   optionally evaporating part of the solvent.

25. The method of claim 24, wherein the hydrolyzing comprises adding an acid to the ink.

26. The method of claim 25, wherein the hydrolyzing further comprises adding an oxidant to the ink.

* * * * *